(12) United States Patent
Maita

(10) Patent No.: US 10,963,161 B2
(45) Date of Patent: Mar. 30, 2021

(54) STORAGE APPARATUS AND ITS CONTROL METHOD

(71) Applicant: HITACHI, LTD., Tokyo (JP)

(72) Inventor: Tetsuya Maita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 120 days.

(21) Appl. No.: 16/294,451

(22) Filed: Mar. 6, 2019

(65) Prior Publication Data

US 2020/0073578 A1 Mar. 5, 2020

(30) Foreign Application Priority Data

Aug. 28, 2018 (JP) .............................. JP2018-158955

(51) Int. Cl.
| | |
|---|---|
| *G06F 7/00* | (2006.01) |
| *G06F 17/00* | (2019.01) |
| *G06F 3/06* | (2006.01) |
| *H04L 29/08* | (2006.01) |

(52) U.S. Cl.
CPC ........ *G06F 3/0605* (2013.01); *H04L 67/1031* (2013.01); *H04L 67/26* (2013.01)

(58) Field of Classification Search
None
See application file for complete search history.

(56) References Cited

U.S. PATENT DOCUMENTS

2004/0250113 A1* 12/2004 Beck ................... G06F 11/0745
726/27
2015/0302008 A1* 10/2015 Ishii ...................... G06F 16/214
707/634
2016/0188898 A1* 6/2016 Karinta ............... G06F 11/1471
726/4

FOREIGN PATENT DOCUMENTS

JP 2010-079581 A 4/2010

* cited by examiner

*Primary Examiner* — Tuan A Pham
(74) *Attorney, Agent, or Firm* — Volpe Koenig

(57) ABSTRACT

A storage apparatus and its control method capable of reducing load and necessary memory capacity on the side of the apparatus, which are required for management, are proposed. A role of a storage administrator, whose set of storage resources which are management objects is included in a set of storage resources which are management objects of one storage administrator or a union of sets of storage resources which are management objects of a plurality of storage administrators, is set as a first role; and in response to the first request from the management terminal used by a storage administrator who is assigned the role other than the first role, a performance information collection unit is requested to collect performance information of necessary storage resources, acquires such performance information, and the acquired performance information is transmitted to the relevant management terminal and is also stored and retained; and wherein regarding the management terminal used by the storage administrator who is determined to be assigned the first role, an instruction is issued to stop the periodic polling and the performance information is push-distributed to the relevant management terminal at a stage where the performance information of all the storage resources which are the management objects of the relevant storage administrator is acquired.

12 Claims, 20 Drawing Sheets

| | STORAGE ADMINISTRATOR | | | | | | PATTERN |
|---|---|---|---|---|---|---|---|
| | A | B | C | D | E | F | |
| DISPLAY STATUS OF USAGE STATUS REPORT | ○ | ○ | ○ | ○ | ○ | ○ | 1 |
| | × | ○ | × | × | ○ | × | 2 |
| | × | ○ | × | × | × | ○ | 3 |
| | × | ○ | ○ | ○ | ○ | × | 4 |

PERFORMANCE INFORMATION MANAGEMENT TABLE 36

| RESOURCE ID | PERFORMANCE INFORMATION 1 (IOPS) | PERFORMANCE INFORMATION 2 (AVERAGE RESPONSE TIME) | ... |
|---|---|---|---|
| 0 | Xxxx1 | Yyyy1 | |
| 1 | Xxxx2 | Yyyy2 | |
| 2 | Xxxx3 | Yyyy3 | |
| 3 | Xxxx4 | Yyyy4 | |
| ... | ... | ... | |

36A  36B  36B  36B

ADMINISTRATOR TABLE 37

| ADMINISTRATOR ID | ROLE | SUBMASTER IDENTIFIER | SYSTEM | MANAGEMENT RESOURCE BIT SET |
|---|---|---|---|---|
| XXX | MASTER | | 1 | 000111110001111110000 |
| YYY | SUBMASTER | 0 | 1 | 111111110000000000000 |
| ZZZ | SUBMASTER | 1 | 1 | 000000011110000000000 |
| WWW | FOLLOWER | | 1 | 000110000010000000010000 |
| OOO | FOLLOWER | | 1 | 000000000000000011000 |
| ... | ... | | ... | ... |

ADMINISTRATOR ACCESS MANAGEMENT TABLE 38

| ADMIN-ISTRATOR ID | ADMINISTRATOR TERMINAL | FIRST ACCESS DATE AND TIME | LAST ACCESS DATE AND TIME |
|---|---|---|---|
| XXX | 11.2.33.44 | 2018/05/02 10:00:01 | 2018/07/31 06:03:01 |
| YYY | 11.2.33.55 | 2018/05/02 16:05:32 | 2018/07/31 06:03:11 |
| ZZZ | 11.2.33.66 | 2018/05/06 10:42:55 | 2018/07/31 06:02:00 |
| WWW | 11.2.33.77 | 2018/05/03 18:00:22 | 2018/07/30 22:15:31 |
| OOO | 11.2.33.88 | 2018/05/05 6:06:05 | 2018/07/31 14:11:01 |
| ... | ... | ... | ... |
| 38A | 38B | 38C | 38D |

STORAGE APPARATUS AND ITS CONTROL METHOD

TECHNICAL FIELD

The present invention relates to a storage apparatus and its control method and is suited for use in, for example, a storage apparatus managed by a plurality of storage administrators.

BACKGROUND ART

Conventionally, a method of collecting data relating to the usage status of a storage apparatus from that storage apparatus by means of polling and accumulating the data in a database by using management software, which is made to operate on a management server, and reporting the data accumulated in the database to a storage administrator has been widely used as a method for confirming the usage status of the storage apparatus for the storage administrator to monitor its performance and capacity.

Meanwhile, the storage apparatus may be managed by an administrator team composed of a plurality of sites and a plurality of persons and a storage resource(s) (hereinafter referred as the management object resource(s)) which is/are an object(s) to be managed by each storage administrator may sometimes be duplicate or independent depending on the relevant storage administrator's role.

Therefore, the management software manages both the current performance information of management object resources of each storage administrator and the past performance information of each management object resource, which is required to analyze the usage status of the storage resources, respectively by using the database, combines the data stored in that database, and reports the usage status of the management object resource(s) of the relevant storage administrator to each storage administrator.

Incidentally, PTL 1 mentioned below discloses an invention relating to polling and capable of continuing acquiring and processing data acquired by polling in a distributed environment where a plurality of data acquisition means for acquiring the data by means of polling, even if some communication failures occurs with one data acquisition means.

CITATION LIST

Patent Literature

PTL 1: Japanese Patent Application Laid-Open (Kokai) Publication No. 2010-79581

SUMMARY OF THE INVENTION

Problems to be Solved by the Invention

However, regarding the configuration that manages both the current performance information of the management object resources of each storage administrator and the past performance information of each management object resource, which is required to analyze the usage status of the storage resources, respectively by using the database as described above, there is a problem of an increase in memory capacity to retain the database depending on the number of the storage resources and the number of the storage administrators.

Furthermore, regarding the management software which cannot retain such a database, it is necessary to collect the performance information of necessary storage resource(s) from the storage apparatus in response to requests from the plurality of storage administrators at timing when each request is accepted. So, there is also a problem of an increase in load on the storage apparatus according to the number of the storage resources and the number of the storage administrators.

The present invention was devised in consideration of the above-described circumstances and aims at proposing a storage apparatus and its control method capable of reducing the load and memory capacity on the side of the apparatus which is required for management.

Means to Solve the Problems

In order to solve the above-described problems, provided according to an aspect of the present invention is a storage apparatus for transmitting performance information of each of storage resources that are management objects of a storage administrator who uses a management terminal in response to a first request transmitted from each of management terminals used by each of a plurality of storage administrators, wherein each of the management terminals executes periodic polling processing for periodically transmitting the first request to the storage apparatus, wherein the storage apparatus includes: a role determination unit that determines a role of each storage administrator based on an inclusion relation between sets of the storage resources which are management objects between the storage administrators; a performance information collection unit that collects the performance information of the storage resources; and a data distribution control unit that distributes the performance information of each of the storage resources which are the management objects of the storage administrator who uses the management terminal, in response to the first request from that management terminal, wherein the role determination unit sets the role of the storage administrator, whose set of the storage resources which are the management objects is included in a set of the storage resources which are the management objects of one of the storage administrators or a union of sets of the storage resources which are the management objects of the plurality of storage administrators, as a first role; wherein in response to the first request from the management terminal used by the storage administrator who is assigned the role other than the first role, the data distribution control unit requests the performance information collection unit for collection of the performance information of the storage resource, which is necessary, acquires such performance information, transmits the acquired performance information to the relevant management terminal, and also stores and retains the acquired performance information; and wherein regarding the management terminal used by the storage administrator who is determined to be assigned the first role, the data distribution control unit issues an instruction to the management terminal to stop the periodic polling processing and performs push distribution of the performance information to the relevant management terminal at a stage where the data distribution control unit acquires the performance information of all the storage resources which are the management objects of the relevant storage administrator.

Furthermore, provided according to an aspect of the present invention is a method for controlling a storage apparatus for transmitting performance information of each of storage resources that are management objects of a storage administrator who uses a management terminal in response to a first request transmitted from each of management terminals used by each of a plurality of storage administrators, wherein each of the management terminals executes periodic polling processing for periodically transmitting the first request to the storage apparatus, wherein the storage apparatus includes: a role determination unit that determines a role of each storage administrator based on an inclusion relation between sets of the storage resources which are management objects between the storage administrators; a performance information collection unit that collects the performance information of the storage resources; and a data distribution control unit that distributes the performance information of each of the storage resources which are the management objects of the storage administrator who uses the management terminal, in response to the first request from that management terminal; and wherein the storage apparatus control method includes: a first step executed by the role determination unit setting the role of the storage administrator, whose set of the storage resources which are the management objects is included in a set of the storage resources which are the management objects of one of the storage administrators or a union of sets of the storage resources which are the management objects of the plurality of storage administrators, as a first role; and a second step executed: in response to the first request from the management terminal used by the storage administrator who is assigned the role other than the first role, by the data distribution control unit requesting the performance information collection unit for collection of the performance information of the storage resource, which is necessary, acquiring such performance information, transmitting the acquired performance information to the relevant management terminal, and also storing and retaining the acquired performance information; and regarding the management terminal used by the storage administrator who is determined to be assigned the first role, by the data distribution control unit issuing an instruction to the management terminal to stop the periodic polling processing and performing push distribution of the performance information to the relevant management terminal at a stage where the data distribution control unit acquires the performance information of all the storage resources which are the management objects of the relevant storage administrator.

When the storage apparatus and its control method according to the present invention are employed, the periodic polling of the management terminal(s) used by the storage administrator(s), whose set of the management object storage resources is included in a set of storage resources that are one storage administrator's management objects or is included in a union of sets of storage resources that are the plurality of storage administrators' management objects, is suppressed; and accordingly, the load on the storage apparatus can be reduced. Incidentally, even in this case, the performance information of each storage resource, which is the management object of the relevant storage administrator, is push-distributed from the storage apparatus to the management terminal used by the storage administrator whose role is set as the first role.

Advantageous Effects of the Invention

The storage apparatus and its control method capable of reducing the load on the side of the apparatus which is required for management can be implemented according to the present invention.

BRIEF DESCRIPTION OF DRAWINGS

FIG. 6 is a chart illustrating a structure example of an administrator access management table;

DESCRIPTION OF EMBODIMENTS

An embodiment of the present invention will be described below in detail with reference to the drawings.

(1) Configuration of Information Processing System According to This Embodiment

Figure 1:
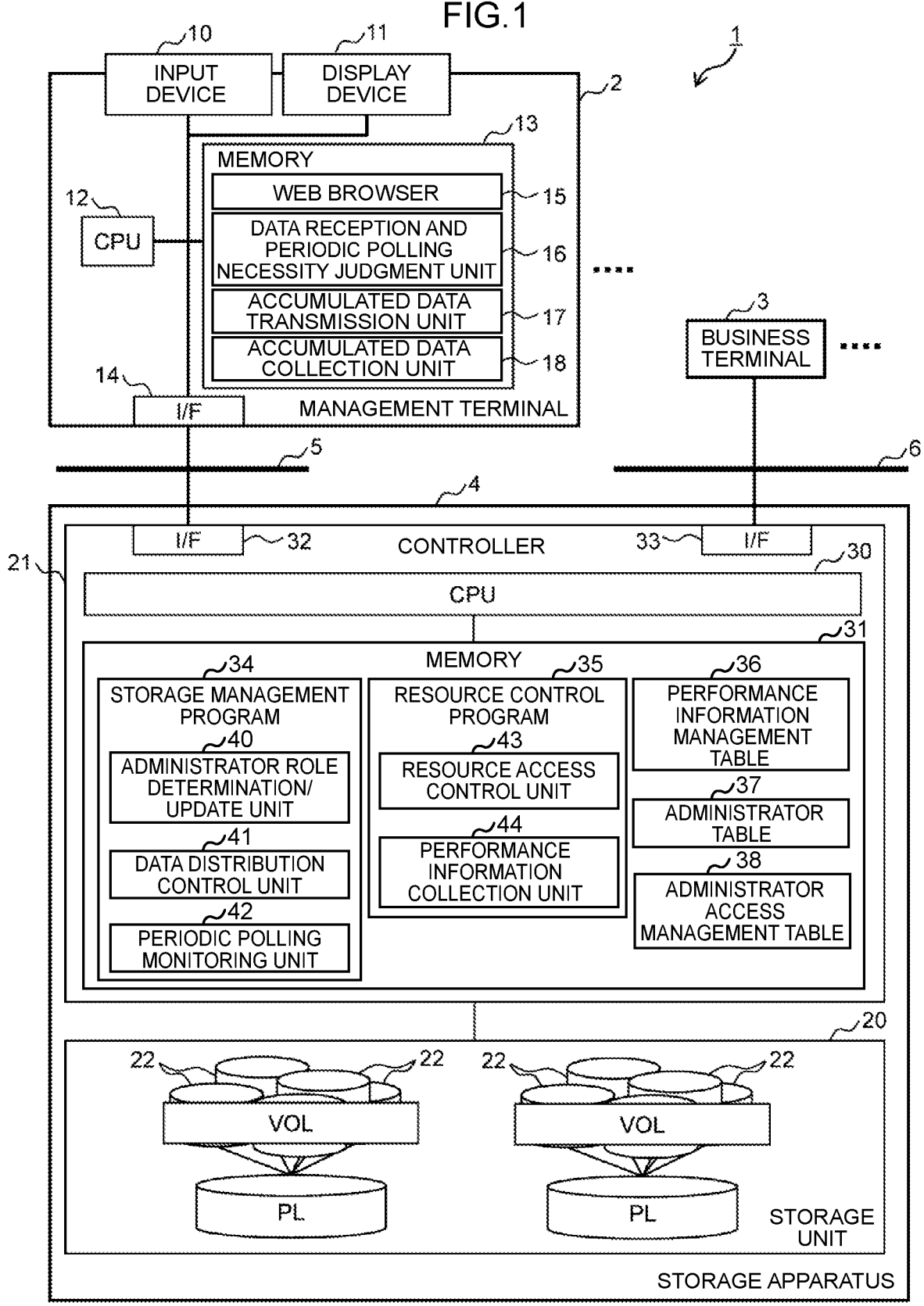
FIG. 1 is a block diagram illustrating an overall configuration of an information processing system according to this embodiment.

Referring to FIG. 1, the reference numeral 1 represents an information processing system according to this embodiment as a whole. This information processing system 1 is configured by including one or more management terminals 2, one or more business terminals 3, and a storage apparatus 4. Then, each management terminal 2 and the storage apparatus 4 are coupled to each other via a first network 5 such as a LAN (Local Area Network) and each business terminal 3 and the storage apparatus 4 are coupled to each other via a second network 6 such as a LAN or SAN (Storage Area Network).

The management terminal 2 is a computer device used by an administrator (storage administrator) of the storage apparatus 4 and is configured by including information processing resources such as an input device 10, a display device 11, a CPU (Central Processing Unit) 12, a memory 13, and an interface 14.

The input device 10 is composed of, for example, a keyboard, a mouse, and/or a touchpad and is used by a storage administrator to enter an operation to the storage apparatus 4. Moreover, the display device 11 is composed of, for example, a liquid crystal display or an organic EL (Electro-Luminescence) display and is used to display necessary screens and information, etc.

The CPU 12 is a processor that controls the entire operation of the management terminal 2. Furthermore, the memory 13 is composed of, for example, a nonvolatile semiconductor memory and is used as a work memory for the CPU 12. In a case of this embodiment, the memory 13 stores and retains a web browser 15, a data reception and periodic polling necessity judgment unit 16, an accumulated data transmission unit 17, and an accumulated data collection unit 18 which are read from, for example, hard disk drives which are not illustrated in the drawing, at the time of activation or when necessary.

The web browser 15 is a program for acquiring information from the storage apparatus 4 via the first network 5 and causing the display device 11 to display a specified screen based on the acquired information. For example, the web browser 15 acquires performance information of management object resources of a storage administrator who uses the relevant management terminal 2 from the storage apparatus 4 and retains the acquired performance information in a session storage (which is not illustrated in the drawing), and displays a screen of a specified format on the display device 11 based on the retained performance information. The details of the data reception and periodic polling necessity judgment unit 16, the accumulated data transmission unit 17, and the accumulated data collection unit 18 will be described later.

The interface 14 is composed of, for example, an NIC (Network Interface Card) and performs protocol control upon communication with the storage apparatus 4 via the first network 5.

The business terminal 3 is a business-use computer device to use the storage apparatus 4 and is composed of, for example, a personal computer, a workstation, or a mainframe. The business terminal 3 reads/writes necessary data from/to the storage apparatus 4 by transmitting an I/O (Input/Output) request(s) in response to a request(s) from implemented software and a user(s).

The storage apparatus 4 is configured by including: a storage unit 20 that provides storage areas for reading/writing data from/to the business terminal 3; and a controller 21 that controls reading/writing of data from/to the storage unit 20.

The storage unit 20 is composed of large-capacity, nonvolatile storage devices 22 such as a plurality of hard disk drives and/or SSDs (Solid State Drives). Storage areas provided by one or more storage devices 22 are gathered and managed as a pool PL and one or more logical volumes VOL are created in the pool PL. Then, data from the business terminal 3 are recorded in this/these logical volume(s) VOL in units of blocks (hereinafter referred as the logical blocks).

Each logical volume VOL is assigned its unique identifier (hereinafter referred as the volume number). In a case of this embodiment, the business terminal 3 writes/reads data to/from the storage apparatus 4 by designating an address which is a combination of this volume number and a unique number of a logical block which is assigned to each logical block (LBA: Logical Block Address).

The controller 21 is configured by including a CPU 30, a memory 31, a first interface 32, and a second interface 33. The CPU 30 is a processor that controls the entire operation of the storage apparatus 4. Moreover, the memory 31 is composed of, for example, a semiconductor memory and is used as a work memory for the CPU 30. A storage management program 34, a resource control program 35, a performance information management table 36, an administrator table 37, and an administrator access management table 38 which will be described later are also stored and managed in this memory 31.

The first interface 32 is hardware for performing protocol control upon communication with each management terminal 2 via the first network 5; and the second interface 33 is hardware for performing protocol control upon communication with each business terminal 3 via the second network 6. The first and second interfaces 32, 33 are composed of, for example, NIC's.

(2) Polling Suppressing Function and Accumulated Data Sharing Function According to This Embodiment Next, a polling suppressing function and an accumulated data sharing function which are implemented in the storage apparatus 4 according to this embodiment will be explained.

With this information processing system 1, the storage administrator can display a report of the usage status of each management object resource of that storage administrator (hereinafter referred as the usage status report) on the display device 11 of that management terminal 2 by performing a specified operation of their own management terminal 2. As a result, the storage administrator can design a management plan regarding load balancing and capacity extension about their own management object resources by referring to this usage status report.

The "usage status" of the management object resources herein means, for example: changes in IOPS (Input/Output Per Second), average response time, and a data transfer speed when the management object resources are ports and logical volumes; and changes in usage rates of the logical volumes and the pool when the management object resources are the logical volumes and the pool. Therefore, accumulated data of the performance information (such as the IOPS, the average response time, the data transfer speed, and/or the usage rates of the logical volumes, etc.) for a certain amount of time or more for each management object resource are required in order for the management terminal 2 to display the above-described usage status report.

Therefore, when displaying the above-described usage status report, the management terminal 2 acquires the accumulated data of these pieces of performance information by executing periodic polling processing for transmitting a request to the storage apparatus 4 for transmission of the current performance information of these management object resources (hereinafter referred as the resource performance information transmission request) on a specified time cycle (for example, on a 5-second cycle basis).

Accordingly, as the number of the management terminals 2 which execute such periodic polling processing becomes larger, the load on the storage apparatus 4 increases and there is a fear that I/O processing in response to I/O requests from the business terminal(s) 3 may be adversely affected depending on the circumstances.

So, the storage apparatus 4 according to this embodiment is equipped with a periodic polling suppressing function that stops the period polling processing on the basis of an inclusion relation between sets of management object resources between the storage administrators, with respect to a management terminal 2 of a storage administrator whose set of their management object resources is included in a set of management object resources of another storage administrator or is included in a union of sets of management object resources of a plurality of other storage administrators.

Then, the storage apparatus 4: retains the performance information of each storage resource acquired at the time of the periodic polling processing of the management terminal(s) of one or more other storage administrators on the "including" side; and performs push distribution of these pieces of performance information to the management terminal 2, regarding which the periodic polling processing was stopped, at the stage where the performance information of all the management object resources of the storage administrator on the "included" side has been successfully acquired.

Now, the inclusion relation between sets of management object resources will be explained. It is assumed here that there are a plurality of storage administrators where their inclusion relation of sets of management object resources are in a state illustrated in FIG. 2. In this example in FIG. 2, "A" is a storage administrator who manages all the storage resources (set a) of the storage apparatus 4 (hereinafter referred to as the general administrator as appropriate) and each of "B" to "F" is a storage administrator who manages storage resources of set b to set f, respectively, which are partial sets of set a (hereinafter referred to as the partial administrator as appropriate).

Figures 2, 3:
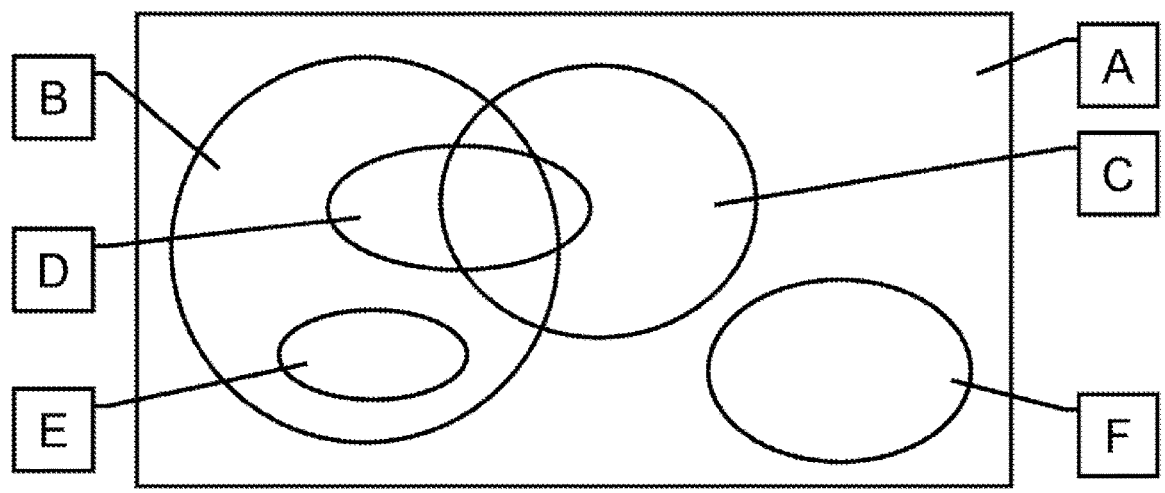
FIG. 2 is a Venn diagram for explaining an inclusion relation between sets of management object resources.
FIG. 3 is a chart for explaining the inclusion relation between sets of management object resources.

In this case, inclusion relation patterns of the management object resources between the storage administrators are classified into four types of patterns illustrated in FIG. 3. Incidentally, referring to this FIG. 3, "○" means a state where the management terminal 2 of the storage administrator corresponding to the relevant row is executing the periodic polling processing; and "×" means a state where the management terminal 2 of the storage administrator corresponding to the relevant row is not executing the periodic polling processing.

The first type is a pattern for which the management terminal 2 of the general administrator "A" is executing the periodic polling processing. In this case, all the set b to set f of the management object resources of each partial administrator are respectively included in set a of the management object resources of "A." Under this circumstance, "A" is set to be assigned a role called a "master" and each of other "B" to "F" is set to be assigned a role called a "follower."

The second type is a pattern for which a set of management object resources of a partial administrator whose management terminal 2 is executing the periodic polling processing is included in a set of management object resources of another partial administrator whose management terminal 2 is executing the periodic polling processing. In the example in FIG. 2, the relation between "E" and "B" corresponds to this pattern. In this case, "B" who is the partial administrator to include the set of the management object resources is set as the "master" and "E" who is the partial administrator whose set of the management object resources is included is set as the "follower."

The third type is a pattern for which management object resources of a plurality of partial administrators whose management terminals 2 are executing the periodic polling processing are completely independent. In the example in FIG. 2, the relation between "B" and "F" corresponds to this pattern. In this case, both "B" and "F" are set as "masters."

The fourth type is a pattern for which a union of management object resources of some partial administrators, whose respective management terminals 2 are executing the periodic polling processing, includes management object resources of other partial administrators. In the example in FIG. 2, the relation between "B" to "E" corresponds to this pattern. Specifically speaking, set d of the management object resources of "D" and set e of the management object resources of "E" are included in the union of set b of the management object resources of "B" and set c of the management object resources of "C."

In this case, regarding "B" and "C" who are the ones to include the sets of the management object resources, "B" with a larger number of management object resources is set to be assigned a role called "master" and "C" with a smaller number of management object resource is set to be assigned a role called a "submaster," Moreover, each of "D" and "E" whose sets of the management object resources are the ones to be included is set as a "follower."

Incidentally, even when the inclusion relation between sets of management object resources of the storage administrators is not as illustrated in the example in FIG. 2, the inclusion relation between the sets of management object resources of the storage administrators is classified into either one of the above-described four types.

Figure 4:
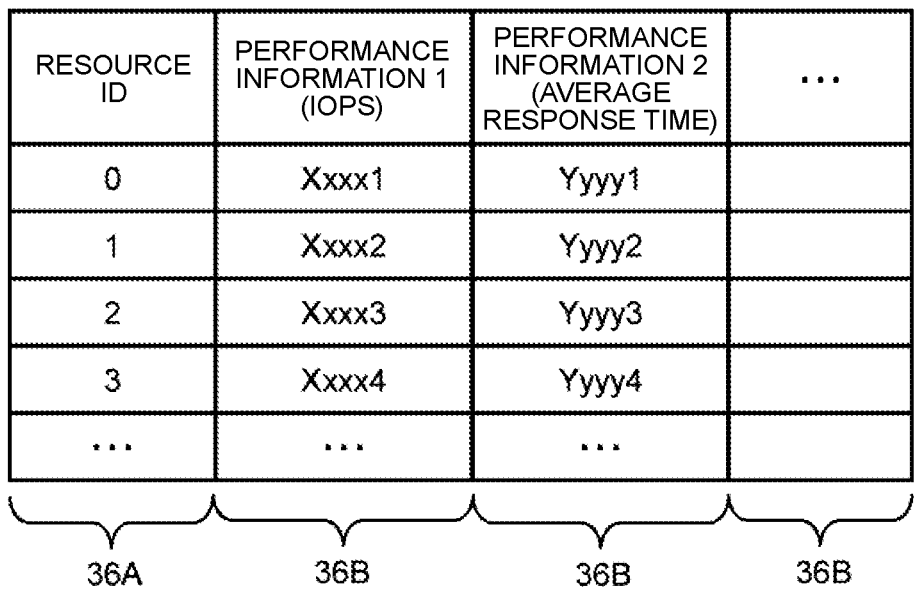
FIG. 4 is a chart illustrating a structure example of a performance information management table.

Then, when the storage apparatus 4 receives a resource performance information transmission request from the management terminal 2 of the storage administrator who is set as a "master," the storage apparatus 4 acquires the latest performance information of all the management object resources of that storage administrator and transmits the acquired performance information to that management terminal 2, and also registers and manages the then-acquired performance information in the performance information management table 36 described later with reference to FIG. 4.

Moreover, when the storage apparatus 4 receives the resource performance information transmission request from a management terminal 2 of a storage administrator who is set as a "submaster," the storage apparatus 4 acquires the latest performance information of each of the management object resources of that storage administrator, which are not duplicate with the management objects of the storage administrator who is set as the "master"; merges the acquired performance information with the latest performance information, which is registered in the performance information management table 36, of the management object resources which are duplicate with those of the storage administrator who is set as the "master"; and transmits the merged result to that management terminal 2.

Furthermore, regarding a management terminal 2 of each storage administrator who is set as a "follower," the storage apparatus 4 causes the management terminal 2 to stop the periodic polling processing so that the relevant management terminal 2 will not transmit the resource performance information transmission request. Then, at the stage where the storage apparatus 4 has acquired the latest performance information of all the management object resources of the storage administrator who is set as the "follower," the storage apparatus 4 distributes these pieces of performance information by a push method to the management terminal 2 of that storage administrator.

Incidentally, regarding this information processing system 1, when the storage administrator who is set as the "master" or the "submaster" enters an operation to their own management terminal 2 to stop displaying the aforementioned usage status report, then that management terminal 2 will no longer execute the periodic polling processing (in other words, that management terminal 2 will no longer transmit the resource performance information transmission request to the storage apparatus 4).

Consequently, there occurs a problem that the performance information of the management object resources of the "follower" storage administrator, regarding whom a part or whole of their set of the management object resources is included in the set of the management object resources of the above-mentioned storage administrator, will not be completed in the performance information management table 36 and the performance information which is necessary for the management terminal 2 of the relevant storage administrator will not be push-distributed.

This problem also occurs when the management terminal used by the storage administrator who is set as the "master" or the "submaster" becomes no longer capable of transmitting the resource performance information transmission request to the storage apparatus 4 due to a failure or the like.

So, the storage apparatus 4 according to this embodiment is also equipped with a function that resets the role(s) of other storage administrators of the same system as a system to which the relevant storage administrator belongs, as necessary, when any one of the storage administrators enters the operation to their own management terminal 2 to stop displaying the aforementioned usage status report, or when no resource performance information transmission request has been transmitted from the management terminal 2 used by the storage administrator who is set as the "master" or the "submaster" for a certain period of time. Incidentally, the details of the above-mentioned "system" will be explained later.

Meanwhile, when a new management terminal 2 is added to this information processing system 1, performance information which can be acquired by that management terminal 2 by transmitting the resource performance information transmission request to the storage apparatus 4 is only the latest performance information of the management object resources of the storage administrator who uses that management terminal 2.

However, when some or all of the management object resources of that storage administrator are duplicate with management object resources of an existing storage administrator(s), past performance information of the duplicate management object resources are saved in the session storage of the web browser 15 (FIG. 1) of the management terminal 2 used by the relevant existing storage administrator. Therefore, it is presumed that if the newly added management terminal 2 can use this past performance information, it would be possible to create a usage status report more promptly and with more accuracy and provide it to the storage administrator.

So, when the new management terminal 2 and the new storage administrator are added to, and registered in, this storage apparatus 4 and if some or all of the management object resources of that storage administrator are duplicate with the management object resources of the existing storage administrator(s), the storage apparatus 4 is also equipped with an accumulated data sharing function that collects the past performance information of the duplicate management object resources from the management terminal(s) 2 used by the existing storage administrator(s) and provides it to the new management terminal.

The memory 31 (FIG. 1) for the storage apparatus 4 stores a storage management program 34, a resource control program 35, a performance information management table 36, an administrator table 37, and an administrator access management table 38 as illustrated in FIG. 1 as a means for implementing the polling suppressing function and the accumulated data sharing function described above.

The resource control program 35 is a program having a function that identifies the relevant storage administrator's management object resources and executes necessary processing when the storage administrator performs a specified operation on their own administrator terminal 2 (FIG. 1) and thereby implements various kinds of management functions represented by the usage status report on each management object resource of that storage administrator. The resource control program 35 includes, as subprograms, a resource access control unit 43 for managing the management object resources of each storage administrator by using an administrator table 37 described later and a performance information collection unit 44 for collecting the performance information of necessary storage resources within the storage apparatus 4.

Furthermore, the storage management program 34 is a program having a function that controls the operation of the entire storage apparatus 4. In a case of this embodiment, the storage management program 34 is configured by including an administrator role determination/update unit 40, a data distribution control unit 41, and a periodic polling monitoring unit 42.

The administrator role determination/update unit 40 is a subprogram having a function that determines/updates the role ("master, "submaster," or "follower") of each storage administrator in accordance with the inclusion relation between sets of management object resources on the basis of information about the management object resources of each storage administrator managed by the resource access control unit 43 for the resource control program 35.

Furthermore, the data distribution control unit 41 is a subprogram having a function that: requests the performance information collection unit 44 of the resource control program 35 for collection of current performance information of each requested storage resource in response to a resource performance information transmission request from the management terminal 2; and transmits these pieces of thus-acquired performance information to a sender of that resource performance information transmission request. The data distribution control unit 41 is also equipped with a function that: collects past performance information of management object storage resources of a storage administrator, who uses a new management terminal 2, from the corresponding existing management terminal 2 in response to a request from the new management terminal 2; and transmits the collected performance information to the new management terminal 2.

Furthermore, the periodic polling monitoring unit 42 is a subprogram having a function that monitors a resource performance information transmission request from the management terminal 2 used by the storage administrator who is set as the "master" or the "submaster." When the periodic polling monitoring unit 42 has not been able to receive any resource performance information transmission request from the above-described management terminal 2 for a certain period of time, the periodic polling monitoring unit 42: recognizes that the management terminal 2 stopped using the storage management program 34; and requests that the administrator role determination/update unit 40 should reset the roles of other storage administrators belonging to a system to which the storage administrator who uses the relevant management terminal 2 belongs.

Meanwhile, the performance information management table 36 is a table that stores the latest performance information of each storage resource collected by the performance information collection unit 44 for the resource control program 35 and includes a resource ID column 36A and a plurality of performance information columns 36B as illustrated in FIG. 4. With the performance information management table 36, one row corresponds to one storage resource.

Then, the resource ID column 36A stores a unique identifier of the relevant storage resource (resource ID) assigned to that storage resource. In the case of this embodiment, a serial number starting from "0" is used as the resource ID. Moreover, each performance information column 36B stores the performance information of the relevant storage resource which was acquired lastly with respect to the relevant storage resource.

Therefore, in a case of an example in FIG. 4, it is shown that regarding a storage resource to which the resource ID "0" is assigned, the last acquired IOPS is "Xxxx1" (the performance information column 36B of "Performance Information 1") and the last acquired average response time is "Yyyy1" (the performance information column 36B of "Performance Information 2").

Figure 5:
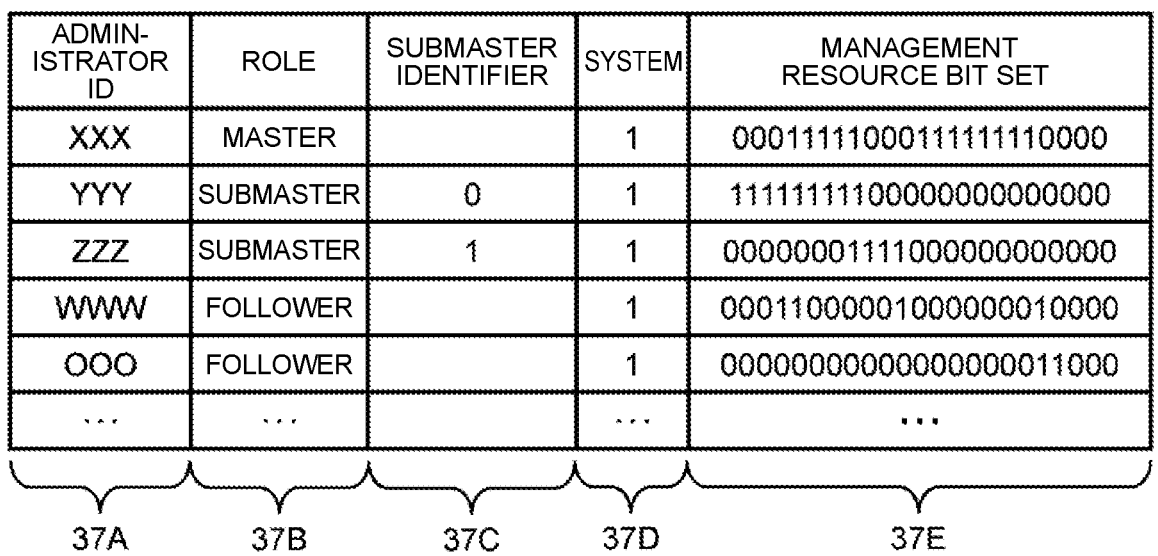
FIG. 5 is a chart illustrating a structure example of an administrator table.

Furthermore, the administrator table 37 is a table used to manage each administrator (storage administrator) of the storage apparatus 4 and includes an administrator ID column 37A, a role column 37B, a submaster identifier column 37C, a system column 37D, and a management resource bit set column 37E as illustrated in FIG. 5. With the administrator table 37, one row corresponds to one storage administrator.

Then, the administrator ID column 37A stores a unique identifier of the relevant storage administrator which is assigned to that storage administrator (administrator ID); and the role column 37B stores the role ("master, "submaster," or "follower") of the relevant storage administrator which is set to that storage administrator.

Furthermore, the system column 37D stores an identifier assigned to a system to which the relevant storage administrator belongs (hereinafter referred as the system number). The "system" herein used means an aggregate of storage administrators regarding whom some or all of their management object resources are duplicate with management object resources of other storage administrators. For example, in the case of the example in FIG. 2, regarding "B" to "E," some or all of the management object resources of "B" to "E" are duplicate with each other in consideration of only the relation between "B" to "F," so that an aggregate of the storage administrators who are "B" to "E" is managed as one system. Furthermore, regarding "F," its management object resources are not duplicate with any one of the management object resources of "B" to "E," so that "F" is managed as another system separate from the aggregate of the storage administrators who are "B" to "E."

When the role of the relevant storage administrator is the "submaster," the submaster identifier column 37C stores the order among other storage administrators who are set as "submasters" in the same system. The meaning and determination method of this order will be described later.

Furthermore, the management resource bit set column 37E stores a bit set regarding the management object resources of the relevant storage administrator (hereinafter referred as the management resource bit set). This management resource bit set is a bit set in which bits respectively associated with the respective storage resources in the storage apparatus 4 are sequentially arranged in an ascending order of the resource ID's of the storage resources as described earlier with reference FIG. 4; and a bit value corresponding to a storage resource which is the management object resource of the relevant storage administrator is "1" and other bit values are set to "0."

Therefore, in a case of an example in FIG. 5, it is shown that a storage administrator with the administrator ID "xxx" is set as a "Master" of system "1"; and storage resources with the resource ID's 3 to 7, 11 to 18, and so on are management object resources.

Furthermore, the administrator access management table 38 is a table used to manage the access status from each storage administrator and includes an administrator ID column 38A, an administrator terminal column 38B, a first access date and time column 38C, and a last access date and time column 38D as illustrated in FIG. 6. With the administrator access management table 38, one row corresponds to one storage administrator.

Then, the administrator ID column 38A stores an administrator ID of the relevant storage administrator; and the administrator terminal column 38B stores a network address of the management terminal 2 used by that storage administrator over the first network 5 (FIG. 1). Moreover, the first access date and time column 38C stores a date and time of a first access from the relevant management terminal 2; and the last access date and time column 38D stores a date and time of a last access from that management terminal 2.

Therefore, in a case of an example in FIG. 6, it is shown that: for example, the network address of a management terminal 2 used by a storage administrator who is assigned the administrator ID "XXX" is "11.2.33.44"; the date and time of the first access from that management terminal 2 is "2018/05/02 10:00:01"; and the date and time of the last access is "2018/7/31 06:03:01."

Meanwhile, the memory 13 for each management terminal 2 stores, in addition to the aforementioned web browser 15, the data reception and periodic polling necessity judgment unit 16, the accumulated data transmission unit 17, and the accumulated data collection unit 18 as illustrated in FIG. 1 as a means for implementing the polling suppressing function and the accumulated data sharing function as described above.

The data reception and periodic polling necessity judgment unit 16 is a program having a function that receives, for example, the relevant performance information transmitted from the storage apparatus 4 in response to a resource performance information transmission request, while judging whether the periodic polling processing should be executed or not, based on the role of the storage administrator who uses their own terminal, which is transmitted together with this performance information from the storage apparatus 4 as described later. The data reception and periodic polling necessity judgment unit 16 executes internal control to stop the periodic polling processing when the role of the storage administrator who uses their own terminal as reported from the storage apparatus 4 is a "follower."

Furthermore, when receiving a request from the storage apparatus 4 for transmission of the past performance information of storage resources stored in the session storage managed by the web browser 15, the accumulated data transmission unit 17 is a program having a function that transmits such performance information to the storage apparatus 4.

Furthermore, the accumulated data collection unit 18 is a program having a function that requests the storage apparatus 4 for transfer of the past performance information of management object resources of the storage administrator who uses their own terminal when their own terminal is newly added to this information processing system 1.

Specific processing content of the data reception and periodic polling necessity judgment unit 16, the accumulated data transmission unit 17, and the accumulated data collection unit 18 will be described later.

(3) Various Kinds of Processing Relating to Polling Suppressing Function and Accumulated Data Sharing Function Next, specific processing content of various kinds of processing executed by the storage apparatus 4 and the management terminal 2 in relation to the polling suppressing function and the accumulated data sharing function will be explained.

Figure 7:
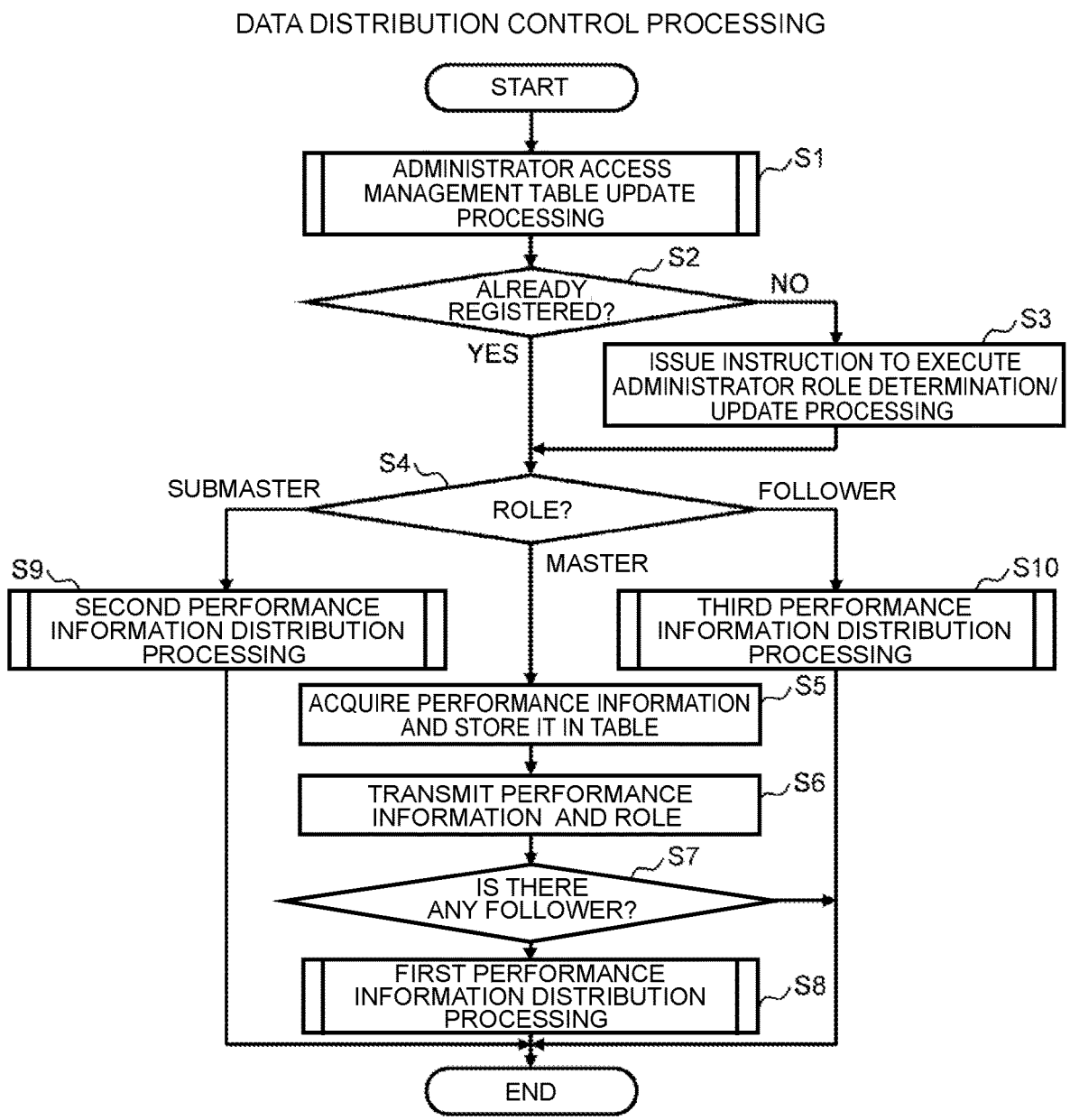
FIG. 7 is a flowchart illustrating a processing sequence for data distribution control processing.

(3-1) Various Kinds of Processing Executed in Relation to Polling Suppressing Function (3-1-1) Data Distribution Control Processing FIG. 7 illustrates a flow of a sequence of processing executed by the storage apparatus 4 which has received a resource performance information transmission request from the management terminal 2 (hereinafter referred as the data distribution control processing). Incidentally, the resource performance information transmission request includes the network address of a management terminal 2, which is a sender, in the first network 5 and the administrator ID of a storage administrator who uses that management terminal 2.

After receiving the resource performance information transmission request, the data distribution control unit 41 (FIG. 1) for the storage apparatus 4 starts the data distribution control processing illustrated in this FIG. 7 and firstly registers the date and time at that time in the administrator access management table 38 (FIG. 6) by associating the date and time with the storage administrator (hereinafter referred as the first request sender storage administrator) who uses the movement terminal 2 which is the sender of that resource performance information transmission request (hereinafter referred as the first request sender management terminal 2) (S1).

Subsequently, the data distribution control unit 41 refers to the administrator table 37 (FIG. 5) and judges whether the administrator ID of the first request sender storage administrator included in the then-received resource performance information transmission request is already registered in the administrator table 37 or not (S2).

To obtain a negative result in this judgment means that the above-mentioned resource performance information transmission request is a first access from the first request sender management terminal 2. Therefore, the data distribution control unit 41 then issues an instruction to the administrator role determination/update unit 40 (FIG. 1) to execute administrator role determination/update processing described later with reference to FIG. 13 (S3). Then, after receiving this instruction, the administrator role determination/update unit 40 determines the role ("master, "submaster," or "follower") of the first request sender storage administrator who uses the first request sender management terminal 2, and registers necessary information about the first request sender storage administrator including the determined result in the administrator table 37 in accordance with the processing sequence illustrated in FIG. 13.

On the other hand, to obtain an affirmative result in the judgment of step S2 means that the above-described resource performance information transmission request is a second or subsequent access from the first request sender management terminal 2 and, therefore, the role of the first request sender storage administrator who uses the first request sender management terminal 2 is already determined and registered in the administrator table 37. Thus, the data distribution control unit 41 then reads the role of the first request sender storage administrator from the administrator table 37 and judges which one of the "master," "submaster," and "follower" the relevant role is (S4).

Then, when the data distribution control unit 41 determines that the role which is set to the first request sender storage administrator is the "master," the data distribution control unit 41 acquires the performance information of each management object resource of the first request sender storage administrator and stores these pieces of acquired performance information in the performance information management table 36 (FIG. 4) (S5).

Specifically speaking, the data distribution control unit 41 firstly acquires a management resource bit set which is stored in a row corresponding to the first request sender storage administrator in the management resource bit set column 37E (FIG. 5) of the administrator table 37 (FIG. 5) in this step S5. Storage resources corresponding to the respective bits whose values in this management resource bit set are set as "1" are management object resources of the first request sender storage administrator.

Thus, the data distribution control unit 41 requests the performance information collection unit 44 (FIG. 1) of the resource control program 35 (FIG. 1) for collection of the performance information of these storage resources and stores the performance information of these storage resources (respective management object resources), which is acquired as a result of this request, in the corresponding performance information column 36B of the performance information management table 36, respectively.

Subsequently, the data distribution control unit 41 transmits the role of the first request sender storage administrator which was identified in step S4, and the performance information of each storage resource (each management object resource) which was acquired in step S5, to the first request sender management terminal 2 (S6).

Furthermore, the data distribution control unit 41 refers to the administrator table 37 and judges whether any storage administrator who belongs to the same system as that of the first request sender storage administrator and whose role is set as a "follower" exists or not (S7). Then, if the data distribution control unit 41 obtains a negative result in this judgment, it terminates this data distribution control.

On the other hand, if the data distribution control unit 41 obtains an affirmative result in the judgment of step S7, the data distribution control unit 41: executes first performance information distribution processing for performing push distribution of necessary performance information to the management terminal 2 of each storage administrator whose then-detected role is set as the "follower" (S8); and then terminates this data distribution control processing.

On the other hand, if the data distribution control unit 41 determines in step S4 that the role which is set to the first request sender storage administrator is a "submaster," the data distribution control unit 41: executes second performance information distribution processing for transmitting necessary performance information and the role of the relevant storage administrator to each of the management terminal 2 used by the first request sender storage administrator (the first request sender management terminal 2) and the management terminal 2 used by the storage administrator who belongs to the same system as that of the first request sender storage administrator and whose role is set as the "follower" (S9); and then terminates this data distribution control processing.

Furthermore, if the data distribution control unit 41 determines in step S4 that the role which is set to the first request sender storage administrator is a "follower," the data distribution control unit 41: executes third performance information distribution processing for transmitting the performance information of each storage resource (each management object resource) managed by the first request sender storage administrator to the management terminal 2 used by the first request sender storage administrator (the first request sender management terminal 2) (S10); and then terminates this data distribution control processing.

(3-1-2) Administrator Access Management Table Update Processing

Figure 8:
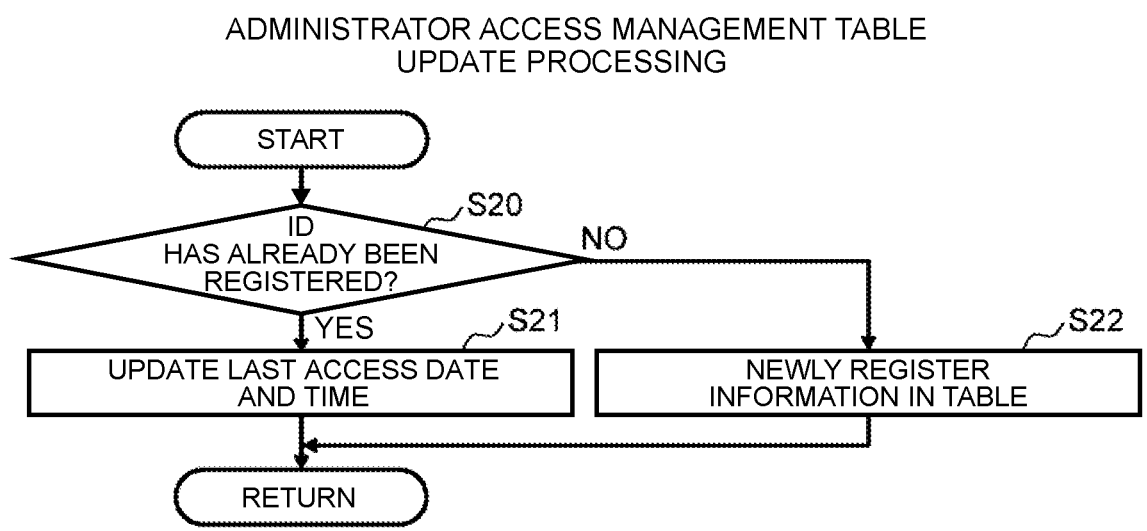
FIG. 8 is a flowchart illustrating a processing sequence for administrator access management table update processing.

FIG. 8 illustrates specific processing content of the administrator access management table update processing executed by the data distribution control unit 41 in step S1 of the data distribution control processing described above with reference to FIG. 7.

Having proceeded to step S1 of the data distribution control processing, the data distribution control unit 41 starts the administrator access management table update processing illustrated in this FIG. 8 and firstly refers to the administrator access management table 38 (FIG. 6) and judges whether the administrator ID of the first request sender storage administrator included in the then-received resource performance information transmission request is already registered in the administrator access management table 38 or not (S20).

Then, if the data distribution control unit 41 obtains an affirmative result in this judgment, it updates the date and time which are stored in a row corresponding to the first request sender storage administrator in the last access date and time column 38D of the administrator access management table 38 (the row where the administrator ID of the first request sender storage administrator is stored in the administrator ID column 38A) to the current date and time (S21). Subsequently, the data distribution control unit 41 terminates this administrator access management table update processing and returns to the data distribution control processing (FIG. 7).

On the other hand, if the data distribution control unit 41 obtains a negative result in the judgment of step S20, it newly registers necessary information about the first request sender storage administrator at that time in the administrator access management table 38 (S22).

Specifically speaking, the data distribution control unit 41 secures an unused row of the administrator access management table 38 and stores the administrator ID of the first request sender storage administrator included in the then-received resource performance information transmission request in the administrator ID column 38A of that row. Moreover, the data distribution control unit 41 stores the network address of the first request sender management terminal 2 in the first network 5, which was acquired at the time of reception of the resource performance information transmission request, in the administrator terminal column 38B of that row and also stores the current date and time in both the first access date and time column 38C and the last access date and time column 38D of that row.

Subsequently, the data distribution control unit 41 terminates this administrator access management table update processing and returns to the data distribution control processing (FIG. 7).

(3-1-3) First Performance Information Distribution Processing

Figure 9:
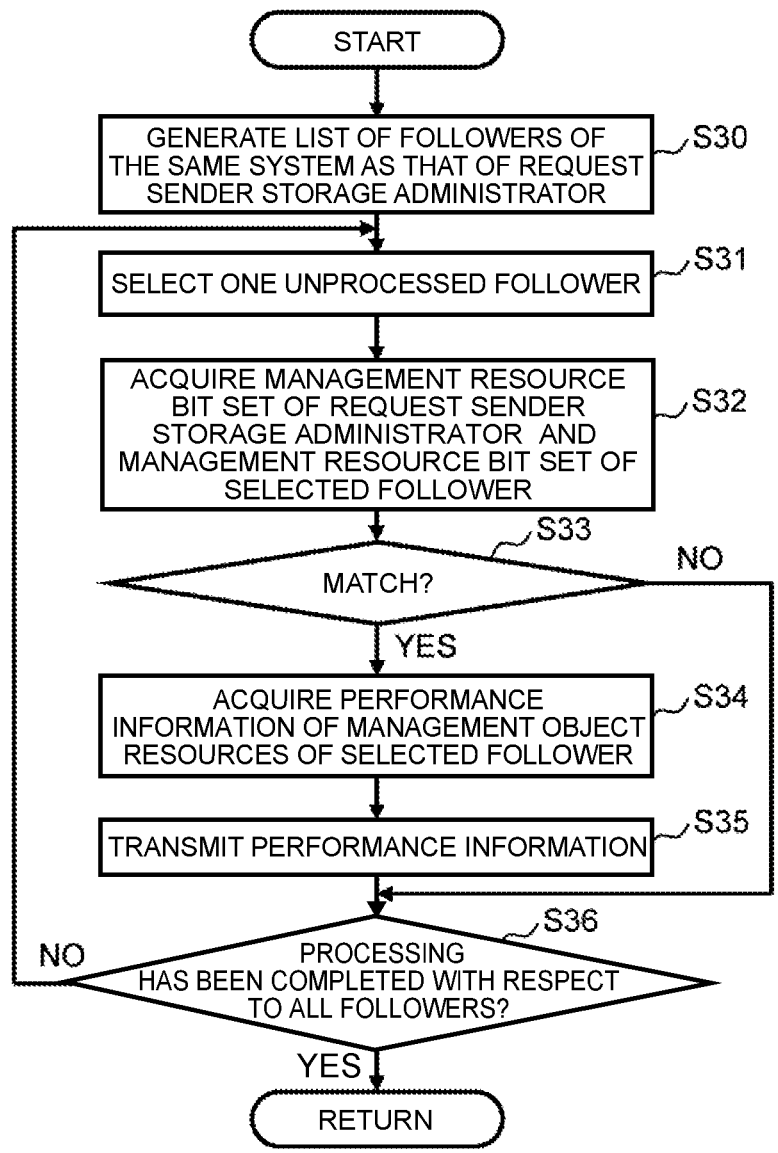
FIG. 9 is a flowchart illustrating a processing sequence for first performance information distribution processing.

Meanwhile, FIG. 9 illustrates specific processing content of the first performance information distribution processing executed by the data distribution control unit 41 in step S8 of the data distribution control processing described earlier with reference to FIG. 7.

Having proceeded to step S8 of the data distribution control processing, the data distribution control unit 41 starts the first performance information distribution processing illustrated in this FIG. 9 and firstly refers to the administrator table 37 (FIG. 5) and generates a list of storage administrators who belong to the same system as that of the "master" first request sender storage administrator and whose roles are set as "followers" (S30).

Specifically speaking, the data distribution control unit 41 extracts information of a row(s), in which the same value as a value stored in the system column 37D (FIG. 5) of a row corresponding to the first request sender storage administrator in the administrator table 37 and the role stored in the role column 37B (FIG. 5) is the "follower," from the administrator table 37 and generates a list of such rows (hereinafter referred as the same system follower list).

Subsequently, the data distribution control unit 41 selects one "follower" from among the "followers" registered in the same system follower list (S31) and acquires a management resource bit set of the selected "follower" (hereinafter referred as the selected "follower") and a management resource bit set of the first request sender storage administrator who is the "master," respectively, from the administrator table 37 (S32).

Next, the data distribution control unit 41 executes a bit operation to perform an AND operation for each relevant bit between the management resource bit set of the selected "follower" obtained in step S32 and the management resource bit set of the first request sender storage administrator (hereinafter referred as the bitwise AND operation) and judges whether the operation result matches the management resource bit set of the selected "follower" or not (S33).

To obtain a negative result in this judgment means that, for example, like the relation between "B" and "D" in FIG. 2, a set of management object resources of the selected "follower" is not completely included in a set of management object resources of the first request sender storage administrator who is the "master" and the latest performance information of all the management object resources of the selected "follower" cannot be completed with only the performance information of the management object resources of the first request sender storage administrator which was acquired in step S5 of the immediately preceding data distribution control processing (FIG. 7). Thus, the data distribution control unit 41 then terminates this first performance information distribution processing and returns to the data distribution control processing.

Figure 11:
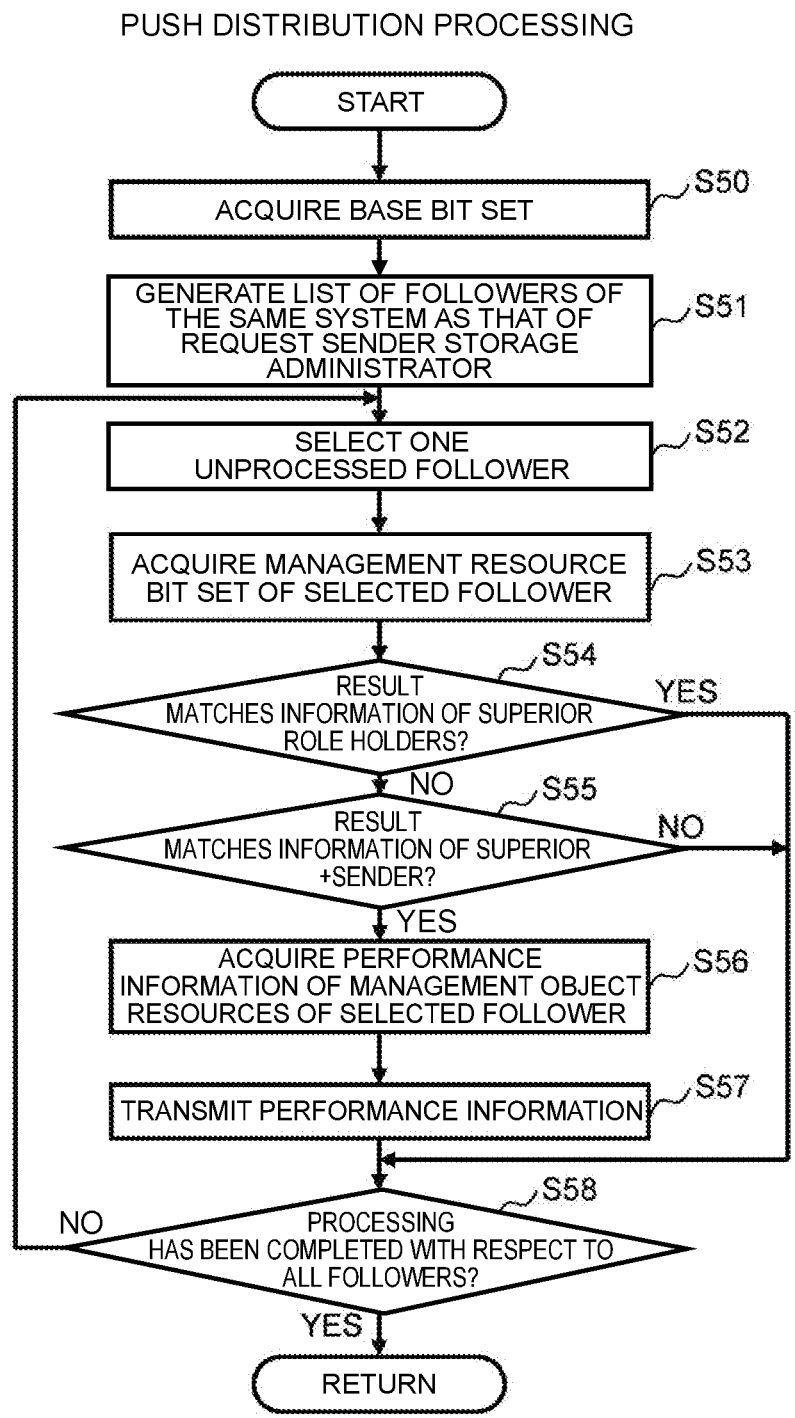
FIG. 11 is a flowchart illustrating a processing sequence for push distribution processing.

Incidentally, in this case, regarding the management object resources of the selected "follower," the latest performance information of all the management object resources of the selected "follower" will be completed when the performance information of the management object resources of the "submaster" (for example, "C" in FIG. 2) in which each storage resource that is not included in the set of management object resources of the first request sender storage administrator is included as their management object resource is acquired, so that at this stage, the latest performance information of each management object resource of the selected "follower" will be push-disturbed to the management terminal 2 of the selected "follower" (see step S55 to step S57 in FIG. 11).

On the other hand, to obtain an affirmative result in the judgment of step S33 means that, for example, like the relation between "B" and "E" in FIG. 2, the set of the management object resources of the selected "follower" is completely included in the set of the management object resources of the first request sender storage administrator who is the "master" and the latest performance information of all the management object resources of the selected "follower" will be completed with only the performance information of the management object resources of the first request sender storage administrator which was acquired in step S5 of the data distribution control processing.

Thus, the data distribution control unit 41 then acquires the performance information of each storage resource corresponding to each bit, whose value in the management resource bit set of the selected "follower" which was acquired in step S32 is set to "1," from the performance information management table 36 (FIG. 4) (S34).

Furthermore, the data distribution control unit 41 acquires the administrator ID of the selected "follower" from the same system follower list generated in step S30, identifies the network address of the management terminal 2 used by the selected "follower" by searching the administrator access management table 38 (FIG. 6) by using this administrator ID as a key, and transmits all the pieces of performance information acquired in step S34 to that network address as a destination (S35).

Next, the data distribution control unit 41 judges whether or not the execution of the processing of step S31 to step S35 has been completed or not with respect to all the storage administrators ("followers") whose information is listed in the same system follower list generated in step S30 (S36).

If the data distribution control unit 41 obtains a negative result in this judgment, it returns to step S31 and then repeats the processing from step S31 to step S36 by sequentially switching the "follower" to be selected in step S31 to another unprocessed "follower" whose information is listed in the same system follower list generated in step S30.

Then, when the data distribution control unit 41 eventually obtains an affirmative result in step S36 by finishing transmitting the performance information of the management object resources of the "followers" to all the "followers" whose information is listed in the same system follower list generated in step S30, it terminates this first performance information distribution processing and returns to the data distribution control processing.

(3-1-4) Second Performance Information Distribution Processing

Figure 10:
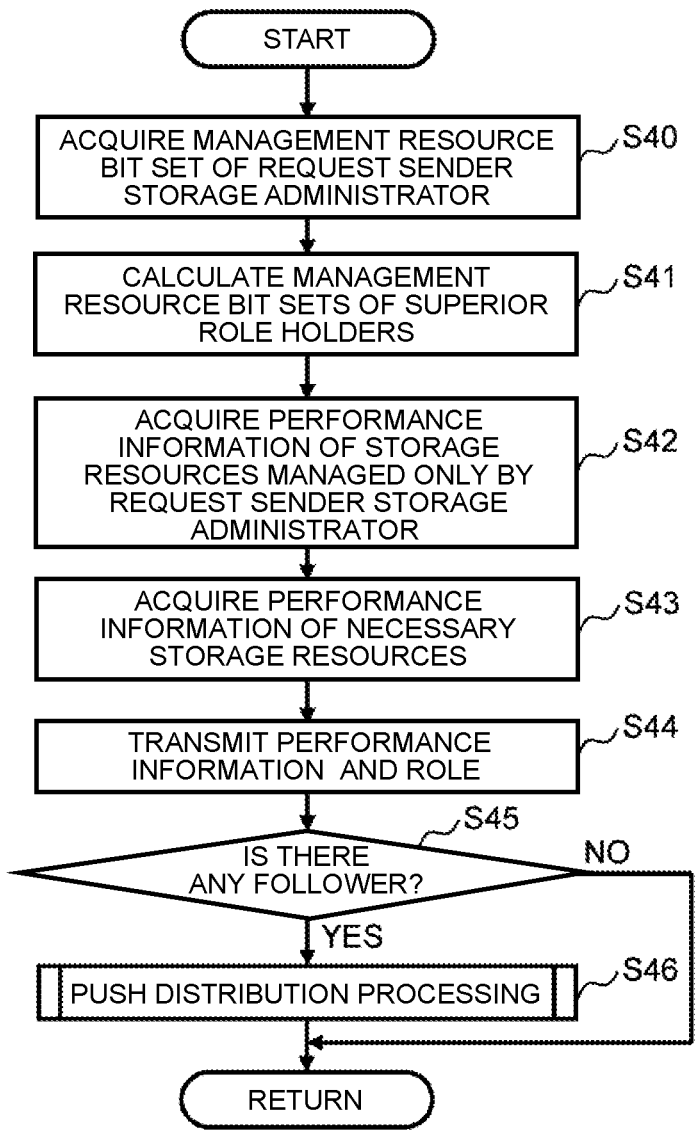
FIG. 10 is a flowchart illustrating a processing sequence for second performance information distribution processing.

FIG. 10 illustrates specific processing content of the second performance information distribution processing executed by the data distribution control unit 41 in step S9 of the data distribution control processing described earlier with reference to FIG. 7.

Having proceeded to step S9 of the data distribution control processing, the data distribution control unit 41 starts the second performance information distribution processing illustrated in this FIG. 10 and firstly acquires a management resource bit set of the first request sender storage administrator who is the "submaster" from the administrator table 37 (FIG. 5) (S40).

Subsequently, the data distribution control unit 41 acquires a management resource bit set of the "master" belonging to the same system as that of the first request sender storage administrator and management resource bit sets of all "submasters," who belong to the same system as that of the first request sender storage administrator and whose submaster identifiers are smaller than that of the first request sender storage administrator, respectively from the administrator table 37 and executes a bit operation to perform an OR operation of these acquired management resource bit sets with respect to each bit (hereinafter referred as the bitwise OR operation) (S41).

Incidentally, in the following explanation, the "master" belonging to the same system as that of the first request sender storage administrator and all the "submasters" who belong to the system as that of the first request sender storage administrator and whose submaster identifiers are smaller than that of the first request sender storage administrator will be hereinafter collectively referred to as "superior role holders" of the first request sender storage administrator and the operation result of the bitwise OR operation in step S41 will be hereinafter referred to as the "superior role holders' management resource bit sets." The "superior role holders' management resource bit sets" represent a union of management object resources of the superior role holders of the first request sender storage administrator.

Next, the data distribution control unit 41: identifies storage resources which are not the management object resources of the superior role holders from among the management object resources of the first request sender storage administrator; acquires the latest performance information of these storage resources; and stores the acquired performance information in the performance information management table 36 (FIG. 4) (S42).

Specifically speaking, the data distribution control unit 41: executes a bit operation to perform an XOR operation between the management resource bit set of the first request sender storage administrator which was acquired in step S40 and the superior role holders' management resource bit sets acquired in step S41 with respect to each corresponding bit (a bitwise XOR operation); and executes the bitwise AND operation between the above-described operation result and the management resource bit set of the first request sender storage administrator.

Regarding the operation result of this bitwise AND operation, storage resources whose relevant bit value is "1" are management object resources which are not the superior role holders' management objects among the management object resources of the first request sender storage administrator. Thus, the data distribution control unit 41 acquires the performance information of these storage resources via the performance information collection unit 44 (FIG. 1) of the resource control program 35 (FIG. 1) and stores these pieces of acquired performance information in the relevant performance information column 36B (FIG. 4) of the performance information management table 36.

Then, the data distribution control unit 41: acquires the performance information of all the storage resources, regarding which the corresponding bit value in the management resource bit set of the first request sender storage administrator that was acquired in step S40 is set to "1," from the performance information management table 36 (S43); and transmits these pieces of acquired performance information and the role ("submaster") of the first request sender storage administrator to the first request sender management terminal 2 (S44).

Subsequently, the data distribution control unit 41 refers to the administrator table 37 (FIG. 5) and judges whether any storage administrator who belongs to the same system as that of the first request sender storage administrator and whose role is set as a "follower" exists or not (S45). Then, if the data distribution control unit 41 obtains a negative result in this judgment, it terminates this second performance information distribution processing and returns to the data distribution control processing (FIG. 7).

On the other hand, if the data distribution control unit 41 obtains an affirmative result in the judgment of step S45, the data distribution control unit 41: executes push distribution processing for performing push distribution of the performance information of the management object resources to the "followers" whose management objects are the management object resources which are not the superior role holders' management objects among the management object resources of the first request sender storage administrator (S46); and then terminates this second performance information distribution processing and returns to the data distribution control processing.

Incidentally, FIG. 11 illustrates specific processing content of the push distribution processing executed in step S46 of the above-described second performance information distribution processing. Having proceeded to step S46 of the second performance information distribution processing, the data distribution control unit 41 starts the push distribution processing illustrated in this FIG. 11 and firstly executes the bitwise OR operation between the superior role holders' management resource bit sets of the first request sender storage administrator ("submaster"), which were calculated in step S41, and the management resource bit set of the first request sender storage administrator which was acquired in step S40 (S50).

The operation result of this bitwise OR operation represents a union of a set of management object resources of the first request sender storage administrator and sets of management object resources of the superior role holders. Therefore, a set of management object resources of the storage administrator who belongs to the same system as that of the first request sender storage administrator and whose role is set as a "follower" is included in this union. Incidentally, in the following explanation, the operation result of step S50 will be hereinafter referred to as the base bit set.

Subsequently, the data distribution control unit 41 generates a list of storage administrators who belong to the same system as that of the first request sender storage administrator and whose roles are set as "followers" (the same system follower list), by referring to the administrator table 37 in the same manner as in step S30 in FIG. 9 (S51).

Furthermore, the data distribution control unit 41 selects one "follower" from the "followers" registered in the same system follower list (S52) and acquires a management resource bit set of the selected "follower" (the selected "follower") from the administrator table 37 (S53).

Subsequently, the data distribution control unit 41: executes the bitwise AND operation between the superior role holders' management resource bit sets calculated in step S41 of the second performance information distribution processing (FIG. 10) and the management resource bit set of the selected "follower" which was acquired in step S53; and judges whether the operation result matches the management resource bit set of the selected "follower" or not (S54).

To obtain an affirmative result in this judgment means that the set of the management object resources of the selected "follower" is included in sets of management object resources of the superior role holders of the first request sender storage administrator and the performance information of the relevant management object resources is push-distributed to the selected "follower" during the first or second performance information distribution processing executed with respect to the above-described superior role holders. Thus, the data distribution control unit 41 then proceeds to step S58 without transmitting the performance information of the management object resources of the selected "follower" to the management terminal 2 of the selected "follower."

On the other hand, if the data distribution control unit 41 obtains a negative result in the judgment of step S54, it executes the bitwise AND operation between the base bit set calculated in step S50 and the management resource bit set of the selected "follower" acquired in step S53 and judges whether the operation result matches the management resource bit set of the selected "follower" or not (S55).

To obtain a negative result in this judgment means that: the set of the management object resources of the selected "follower" is not included in the union of the set of the management object resources of the first request sender storage administrator and the sets of the management object resources of their superior role holders; and the latest performance information of all the management object resources of the selected "follower" may possibly not be stored in the performance information management table 36 (FIG. 4). Thus, the data distribution control unit 41 then proceeds to step S58 without transmitting the performance information of the management object resources of the selected "follower" to the management terminal 2 of the selected "follower."

On the other hand, to obtain an affirmative result in the judgment of step S55 means that the set of the management object resources of the selected "follower" is included in the union of the set of the management object resources of the first request sender storage administrator and the sets of the management object resources of their superior role holders and the latest performance information of all the management object resources of the selected "follower" is stored in the performance information management table 36.

Thus, the data distribution control unit 41 then acquires the performance information of all storage resources whose corresponding bit value in the management resource bit set of the selected "follower" is set to "1" (the management object resources), from the performance information management table 36 (S56).

Furthermore, the data distribution control unit 41 identifies the network address of the management terminal 2 used by the selected "follower" and transmits all pieces of the performance information acquired in step S56 to the network address as a destination in the same manner as in step S35 in FIG. 9 (S57).

Next, the data distribution control unit 41 judges whether or not the execution of the processing of step S53 to step S57 has been completed with respect to all the storage administrators ("followers") whose relevant information is listed in the same system follower list generated in step S51 (S58).

If the data distribution control unit 41 obtains a negative result in this judgment, it returns to step S52 and then repeats the processing from step S52 to step S58 by sequentially switching the "follower" to be selected in step S52 to another unprocessed "follower" whose information is listed in the same system follower list generated in step S51.

Then, when the data distribution control unit 41 eventually obtains an affirmative result in step S58 by finishing transmitting the performance information of the relevant management object resources to all the "followers" whose information is listed in the same system follower list generated in step S51, it terminates this push distribution processing and returns to the second performance information distribution processing.

(3-1-5) Third Performance Information Distribution Processing

Figure 12:
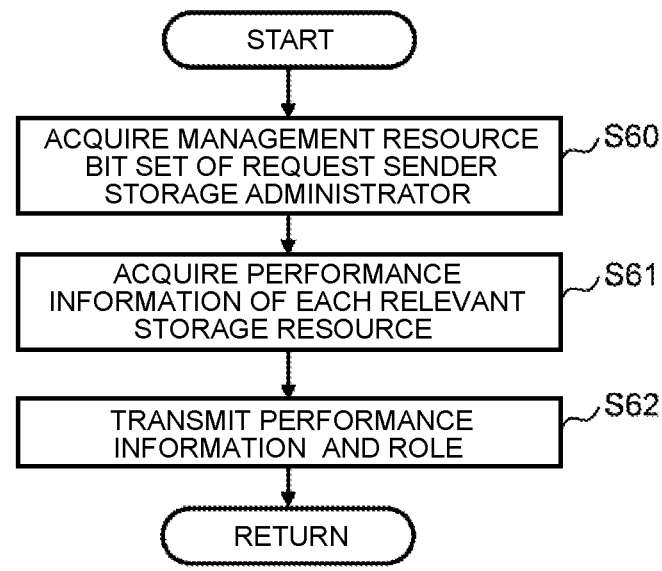
FIG. 12 is a flowchart illustrating a processing sequence for third performance information distribution processing.

FIG. 12 illustrates specific processing content of the third performance information distribution processing executed by the data distribution control unit 41 in step S10 of the data distribution control processing described earlier with reference to FIG. 7.

Having proceeded to step S10 of the data distribution control processing, the data distribution control unit 41 starts the third performance information distribution processing illustrated in this FIG. 12 and firstly acquires the management resource bit set of the first request sender storage administrator, who is the "follower," from the administrator table 37 (FIG. 5) (S60).

Subsequently, the data distribution control unit 41 acquires the latest performance information of all storage resources, whose corresponding bit value in the management resource bit set of the first request sender storage administrator is set to "1" (the management object resources), from the performance information management table 36 (S61).

Next, the data distribution control unit 41 transmits the performance information of each management object resource of the first request sender storage administrator, which was acquired in step S61, and the role ("follower") of that first request sender storage administrator to the management terminal 2 which is the sender of the resource performance information transmission request at that time (S62).

Then, the data distribution control unit 41 terminates this third performance information distribution processing and returns to the data distribution control processing.

(3-1-6) Administrator Role Determination/Update Processing

Figure 13:
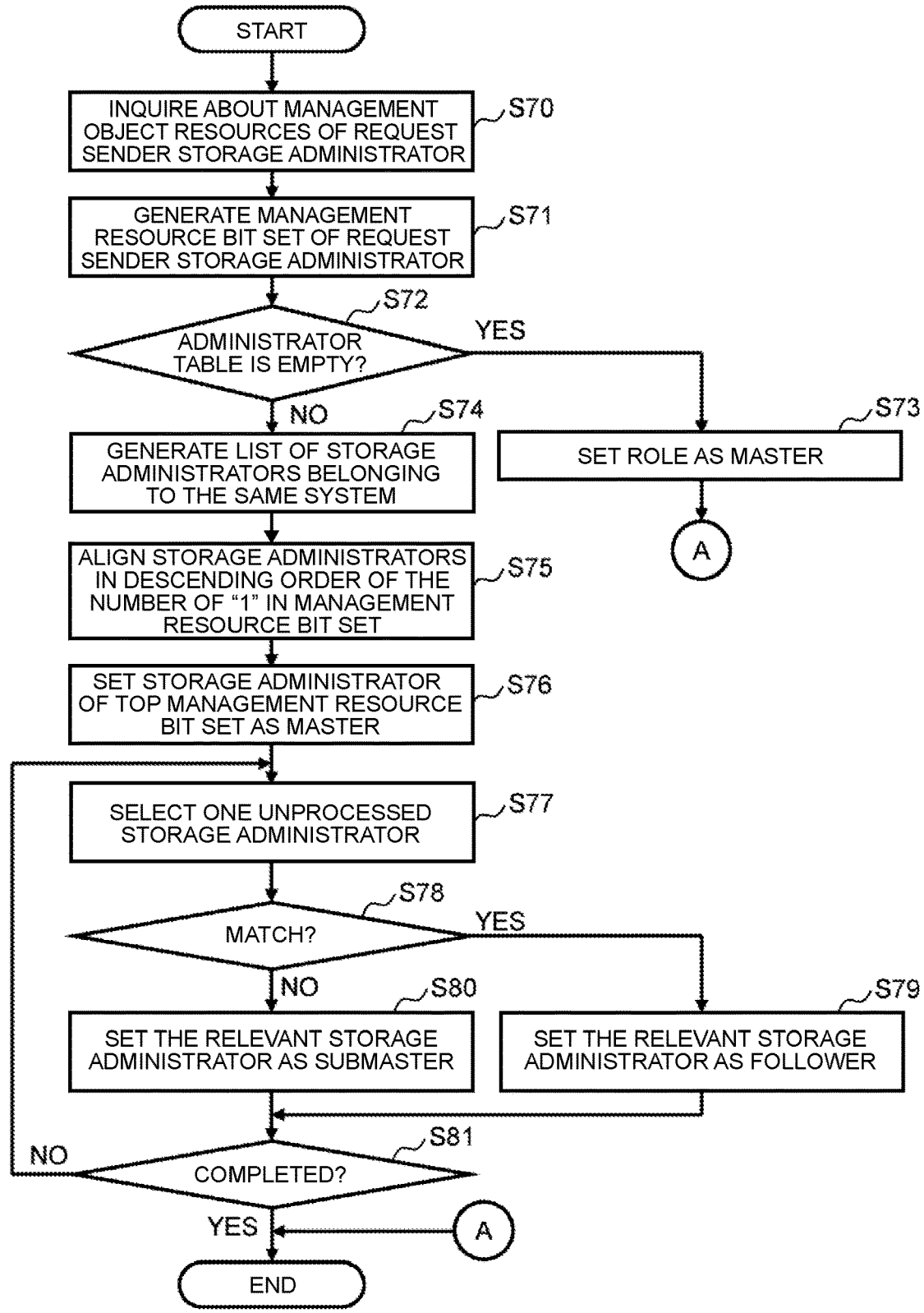
FIG. 13 is a flowchart illustrating a processing sequence for administrator role determination/update processing.

Meanwhile, FIG. 13 illustrates specific processing content of the administrator role determination/update processing executed by the administrator role determination/update unit 40 (FIG. 1) of the storage management program 34 (FIG. 1) which has received the instruction from the data distribution control unit 41 to execute the administrator role determination/update processing in step S3 of the data distribution control processing (FIG. 7).

After receiving the above-described instruction from the data distribution control unit, the administrator role determination/update unit 40 starts the administrator role determination/update processing illustrated in this FIG. 13 and firstly sends an inquiry to the resource access control unit 43 (FIG. 1) of the resource control program 35 (FIG. 1) about the management object resources of the first request sender storage administrator (S70).

Having received this inquiry, the resource access control unit 43: generates a list in which all previously-registered management object resources of the first request sender storage administrator are listed (hereinafter referred as the management object resource list); and transmits the generated management object resource list to the administrator role determination/update unit 40.

Subsequently, the administrator role determination/update unit 40 generates a management resource bit set of the first request sender storage administrator based on the management object resource list acquired in step S70 (S71). Specifically speaking, the administrator role determination/update unit 40: generates a bit string in which bits respectively corresponding to all the storage resources in the storage apparatus 4 are aligned (all the bit values are "0" at the beginning); and then generates the above-described management resource bit set by setting the bit values corresponding to the storage resources listed in the management object resource list acquired in step S70, among the bit string, to "1."

Next, the administrator role determination/update unit 40 judges whether the current administrator table 37 is empty or not, by referring to the administrator table 37 (FIG. 5) (S72).

Under this circumstance, to obtain an affirmative result in this judgment means that the first request sender storage administrator at that time is a first storage administrator who has sent the resource performance information transmission request to the storage apparatus 4. Thus, the administrator role determination/update unit 40 then registers that first request sender storage administrator in the administrator table 37 by setting their role as the "master" (S73) and then terminates this administrator role determination/update processing.

On the other hand, to obtain a negative result in the judgment of step S72 means that the first request sender storage administrator at that time is not the first storage administrator who has sent the resource performance information transmission request to the storage apparatus 4 and a storage administrator(s) whose role is already set and registered in the administrator table 37 exists.

Thus, the administrator role determination/update unit 40 then generates a list in which all the storage administrators belonging to the same system as that of the first request sender storage administrator at that time are listed (hereinafter referred as the storage administrator list), among the storage administrators already registered in the administrator table 37 (S74).

Specifically speaking, the administrator role determination/update unit 40: sequentially executes the bitwise AND operation between the management resource bit set of each storage administrator, who is already registered in the administrator table 37, and the management resource bit set of the then first request sender storage administrator which was generated in step S71; and generates a storage administrator list that lists the administrator ID's of storage administrators corresponding to the management resource bit sets regarding which all the bits of the operation result are not "0," and the management resource bit sets of the relevant storage administrators.

Subsequently, the administrator role determination/update unit 40: aligns the storage administrators listed in the storage administrator list generated in step S74 in descending order of the number of bits which are set to "1" in their management resource bit sets (S75); and determines the first storage administrator in the sequential order as a "master" (S76).

Next, the administrator role determination/update unit 40 selects one storage administrator, regarding whom the processing of step S78 and subsequent steps has not been processed yet, and who is aligned as the earliest one in the sequential order of alignment among storage administrators listed in the storage administrator list generated in step S74 and other than the storage administrator who was set as the "master" in step S76 (S77).

Furthermore, the administrator role determination/update unit 40 executes the bitwise OR operation between the management resource bit set of the storage administrator selected in step S77 (hereinafter referred as the selected storage administrator) and the management resource bit set of the storage administrator determined as the "master" in step S76. Furthermore, the administrator role determination/update unit 40 executes the bitwise AND operation between this operation result and the management resource bit set of the selected storage administrator and judges whether the operation result matches the management resource bit set of the selected storage administrator or not (S78).

To obtain an affirmative result in this judgment means that a set of management object resources of the selected storage administrator is included in a set of management object resources of the storage administrator determined as the "master" in step S76. Thus, the administrator role determination/update unit 40 then determines the selected storage administrator as a "follower" (S79).

On the other hand, to obtain a negative result in the judgment of step S78 means that the set of management object resources of the selected storage administrator is not included in the set of management object resources of the storage administrator determined as the "master" in step S76. Thus, the administrator role determination/update unit 40 then determines the selected storage administrator as a "submaster" and assigns an integer equal to or more than "0", which has not been used yet in the same system, as the submaster identifier to that selected storage administrator (S80).

Subsequently, the administrator role determination/update unit 40 judges whether the execution of the processing of step S78 to step S80 has been completed or not with respect to all the storage administrators other than the storage administrator determined as the "master" in step S76 among the storage administrators listed in the storage administrator list generated in step S74 (S81).

If the administrator role determination/update unit 40 obtains a negative result in this judgment, it returns to step S77 and then repeats the processing from step S77 to step S81 by sequentially switching the storage administrator to be selected in step S77 to another relevant unprocessed storage administrator.

Then, when the administrator role determination/update unit 40 eventually obtains an affirmative result in step S81 by finishing executing the processing of step S78 to step S80 with respect to the storage administrators other than the "master" and listed in the storage administrator list generated in step S74, it terminates this administrator role determination/update processing.

(3-1-7) Data Reception and Periodic Polling Necessity Judgment Processing

Figure 14:
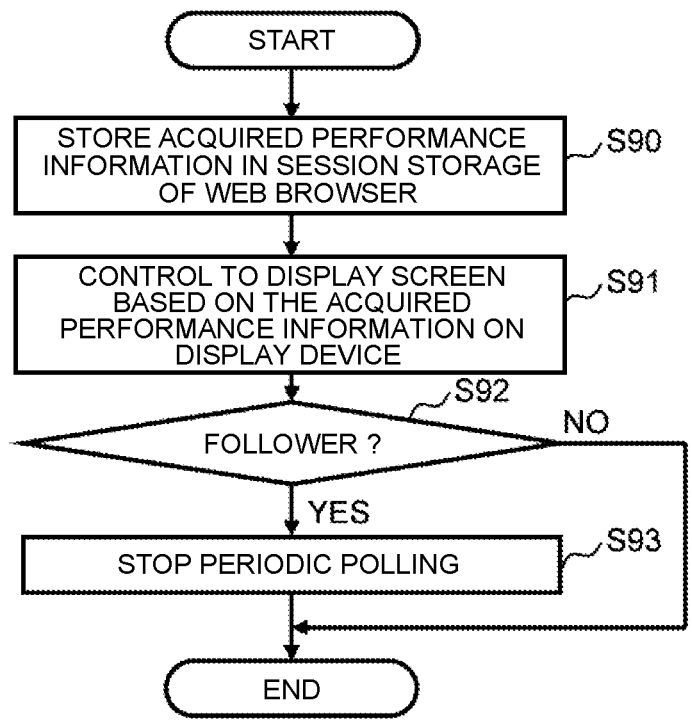
FIG. 14 is a flowchart illustrating a processing sequence for data reception and periodic polling necessity judgment processing.

Meanwhile, FIG. 14 illustrates the details of a sequence of processing executed by the data reception and periodic polling necessity judgment unit 16 (FIG. 1) of the management terminal 2 which has received a response (the role and the performance information of each management object resource) for a resource performance information transmission request after transmitting the resource performance information transmission request to the storage apparatus 4 (hereinafter referred as the data reception and periodic polling necessity judgment processing).

After receiving the above-described response, the data reception and periodic polling necessity judgment unit 16 starts the data reception and periodic polling necessity judgment processing illustrated in this FIG. 14 and firstly stores the performance information of each management object resource, which is included in the above-described response, in the session storage of the web browser 15 (FIG. 1) by using the resource ID of each management object resource as a key (S90).

Subsequently, the data reception and periodic polling necessity judgment unit 16 controls the web browser 15 so as to cause the display device 11 (FIG. 1) to display the usage status report based on the performance information of the management object resources stored in the session storage in step S90 (S91).

Furthermore, the data reception and periodic polling necessity judgment unit 16 acquires the role included in the above-described response and judges whether the acquired role is the "follower" or not (S92). Then, if the data reception and periodic polling necessity judgment unit 16 obtains a negative result in this judgment, it terminates this data reception and periodic polling necessity judgment.

On the other hand, if the data reception and periodic polling necessity judgment unit 16 obtains an affirmative result in the judgment of step S92, it changes the internal settings of its own terminal so as to stop the periodic polling (S93) and terminates this data reception and periodic polling necessity judgment.

(3-1-8) Role Resetting Processing Upon Suspension of Use

Figure 15:
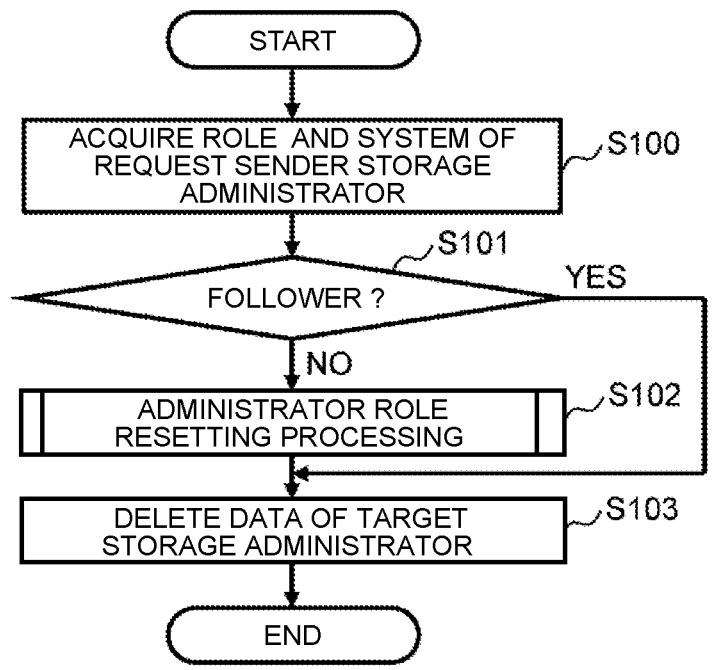
FIG. 15 is a flowchart illustrating a processing sequence for role resetting processing upon suspension of use.

FIG. 15 illustrates specific processing content of a sequence of processing executed by the administrator role determination/update unit 40 when any one of the storage administrators enters the operation to their own management terminal 2 so as to stop displaying the usage status report (hereinafter referred as the role resetting processing upon suspension of use).

In the case of this information processing system 1, when the storage administrator enters the operation to their own management terminal 2 so as to stop displaying the aforementioned usage status report, the management terminal 2 transmits a request to the storage apparatus 4 to stop using the storage management program 34 (hereinafter referred as the storage management program use suspension request) in response to the above-described operation. Incidentally, the storage management program use suspension request includes the administrator ID of the storage administrator who uses the management terminal 2 which is the sender.

Then, the administrator role determination/update unit 40 of the storage apparatus 4 which has received this storage management program use suspension request resets the roles of other storage administrators belonging to the same system as that of the relevant storage administrator in accordance with the processing sequence illustrated in FIG. 15.

Specifically speaking, after receiving the above-described storage management program use suspension request, the administrator role determination/update unit 40 starts the role resetting processing upon suspension of use as illustrated in FIG. 15 and firstly acquires the role of the storage administrator to whom the administrator ID included in that storage management program use suspension request is assigned (hereinafter referred as the target storage administrator) and the system number of the system to which that target storage administrator belongs, from the administrator table 37 (S100).

Subsequently, the administrator role determination/update unit 40 judges whether the role of the target storage administrator which was acquired in step S100 is a "follower" or not (S101).

Under this circumstance, to obtain an affirmative result in this judgment means that the management terminal 2 of the target storage administrator is not executing the periodic polling processing and, therefore, it will not exert any influence on other storage administrators. Thus, the administrator role determination/update unit 40 then proceeds to step S103.

On the other hand, to obtain a negative result in the judgment of step S101 means that when the management terminal 2 of the target storage administrator stops using the storage management program, this will influence the "follower" storage administrator regarding whom a part or whole of the set of their management object resources is included in the set of management object resources of the target storage administrator.

Thus, the administrator role determination/update unit 40 then executes administrator role resetting processing for resetting the roles of any other storage administrators who will be influenced by the suspension of the use of the storage management program 34 by the management terminal 2 of the target storage administrator (that is, the suspension of the periodic polling processing) (for example, resetting from "follower" to "submaster") (S102).

Furthermore, the administrator role determination/update unit 40 deletes data of records (rows) corresponding to the target storage administrator from the administrator table 37 (FIG. 5) and the administrator access management table 38 (FIG. 6) (S103) and then terminates this role resetting processing upon suspension of use.

(3-1-9) Administrator Role Resetting Processing

Figure 16:
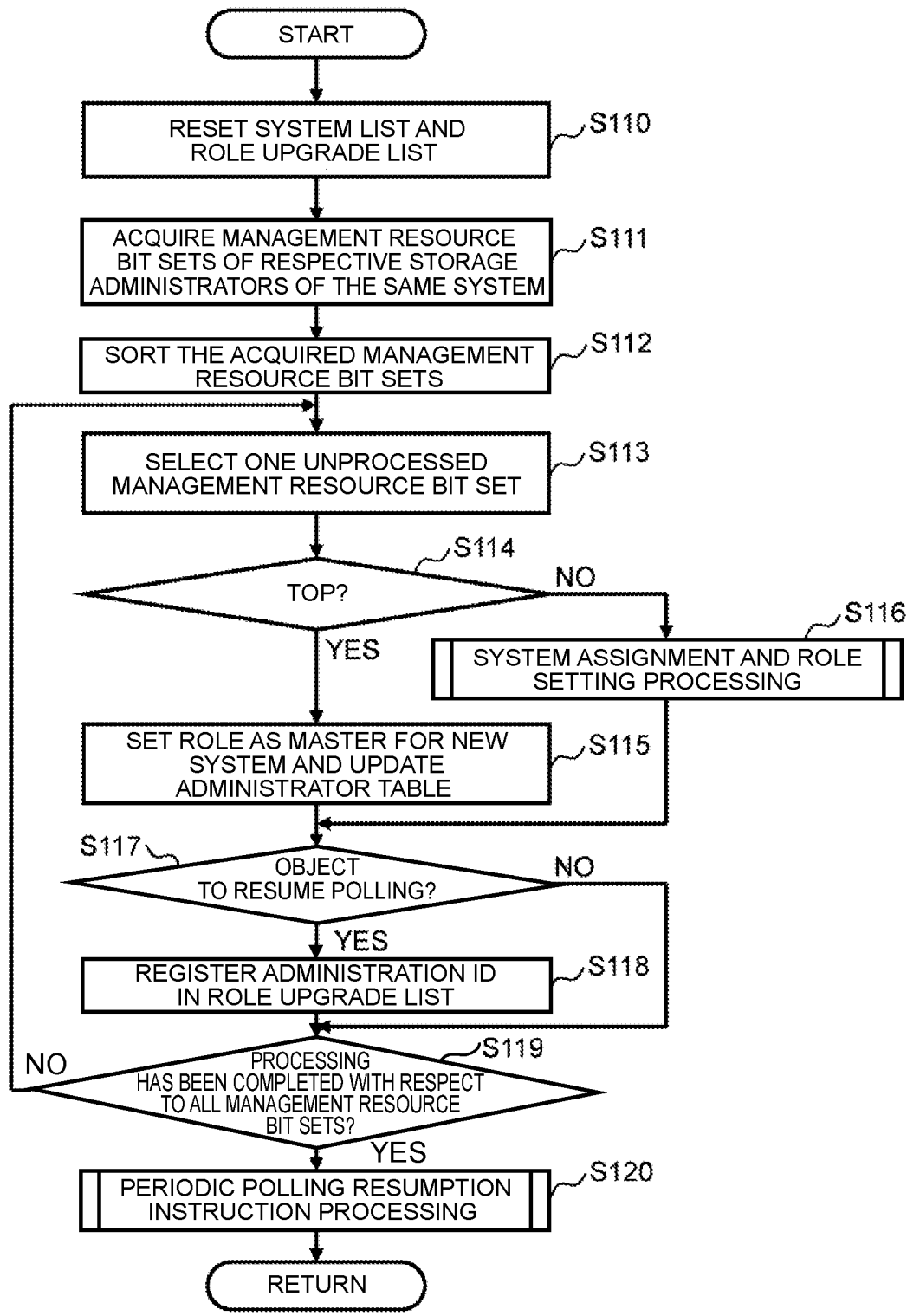
FIG. 16 is a flowchart illustrating a processing sequence for administrator role resetting processing.

FIG. 16 illustrates specific processing content of the administrator role resetting processing executed by the administrator role determination/update unit 40 in step S102 of the role resetting processing upon suspension of use as described above with reference to FIG. 15.

Having proceeded to step S102 of the role resetting processing upon suspension of use, the administrator role determination/update unit 40 starts the administrator role resetting processing illustrated in this FIG. 16 and firstly resets a system list and a role upgrade list which will be explained later (S110).

Subsequently, the administrator role determination/update unit 40 acquires the management resource bit sets of all other storage administrators belonging to the same system as that of the target storage administrator, respectively, from the administrator table 37 (FIG. 5) (S111).

Next, the administrator role determination/update unit 40 sorts the respective management resource bit sets acquired in step S111 in the order of the roles "master," "submaster," and "follower" of the corresponding storage administrators (S112). When this happens and if there are a plurality of management resource bit sets for which the roles of the corresponding storage administrators are "submasters," the administrator role determination/update unit 40 sorts them in ascending order of their submaster identifier values. Furthermore, if there are a plurality of management resource bits regarding which the roles of the corresponding storage administrators are "followers," the administrator role determination/update unit 40 sorts them in descending order of the number of bits which are set to "1."

Furthermore, the administrator role determination/update unit 40 selects one management resource bit set on which the processing of step S114 and subsequent steps has not been executed yet and which is aligned as the earliest bit set in the sequential order of alignment from among the management resource bit sets sorted in step S112 (S113).

Subsequently, the administrator role determination/update unit 40 judges whether or not the management resource bit set selected in step S113 (hereinafter referred as the selected management resource bit set) is the top management resource bit set among the management resource bit sets sorted in step S112 (S114).

Under this circumstance, to obtain an affirmative result in this judgment means that the selected management resource bit set is the management resource bit set of the storage administrator which is undoubtedly set as the "master" in the system to which the target storage administrator belongs. Thus, the administrator role determination/update unit 40 then detects the smallest system number, which has not been used yet, by referring to the administrator table 37 (FIG. 5) and updates the administrator table 37 so as to set the storage administrator corresponding to the then selected management resource bit set as the "master" of a new system which is assigned that system number (S115). Incidentally, if the previous role of the storage administrator which is then set as the "master" of the new system was a "follower," the administrator role determination/update unit 40 issues an instruction to the management terminal 2 used by that storage administrator to resume the periodic polling processing.

On the other hand, if the administrator role determination/update unit 40 obtains a negative result in the judgment of step S114, it assigns the storage administrator corresponding to the selected management resource bit set to the new system and further executes system assignment and role setting processing for setting the role of the storage administrator within that system (S116).

Next, the administrator role determination/update unit 40 judges whether or not the management terminal 2 of the resource administrator corresponding to the selected management resource bit set is a management terminal 2 which should resume the periodic polling processing (S117). Specifically speaking, the administrator role determination/update unit 40 judges whether the previous role of the resource administrator corresponding to the selected management resource bit set in their previous system was a "follower" and their role in the new system is a role other than the "follower" (that is, "master" or "submaster").

Then, if the administrator role determination/update unit 40 obtains a negative result in this judgment, it proceeds to step S119. On the other hand, if the administrator role determination/update unit 40 obtains an affirmative result in the judgment of step S117, it registers the administrator ID of that storage administrator in the role upgrade list so as to cause the management terminal 2 used by the storage administrator corresponding to the selected management resource bit set to resume the periodic polling processing (S118).

Subsequently, the administrator role determination/update unit 40 judges whether the execution of step S113 and subsequent steps has been completed or not with respect to all the management resource bit sets sorted in step S112 (S119). Then, if the administrator role determination/update unit 40 obtains a negative result in this judgment, it returns to step S113 and then repeats the processing from step S113 to step S119 by sequentially switching the management resource bit set to be selected in step S113 to a management resource bit set on which the processing of step S113 and subsequent steps has not been executed yet and which is the smallest in the sequential order of alignment, from among the management resource bit sets sorted in step S112.

Then, when the administrator role determination/update unit 40 eventually obtains an affirmative result in step S119 by finishing executing the processing in step S113 and subsequent steps with respect to all the management resource bit sets sorted in step S112, it executes periodic polling resumption instruction processing for issuing an instruction to the management terminal 2 of each storage administrator whose administrator ID is registered in the aforementioned role upgrade list to resume the periodic polling (S120), and then the administrator role determination/update unit 40 terminates this administrator role resetting processing and returns to the role resetting processing upon suspension of use.

(3-1-10) System Assignment and Role Setting Processing

Figure 17:
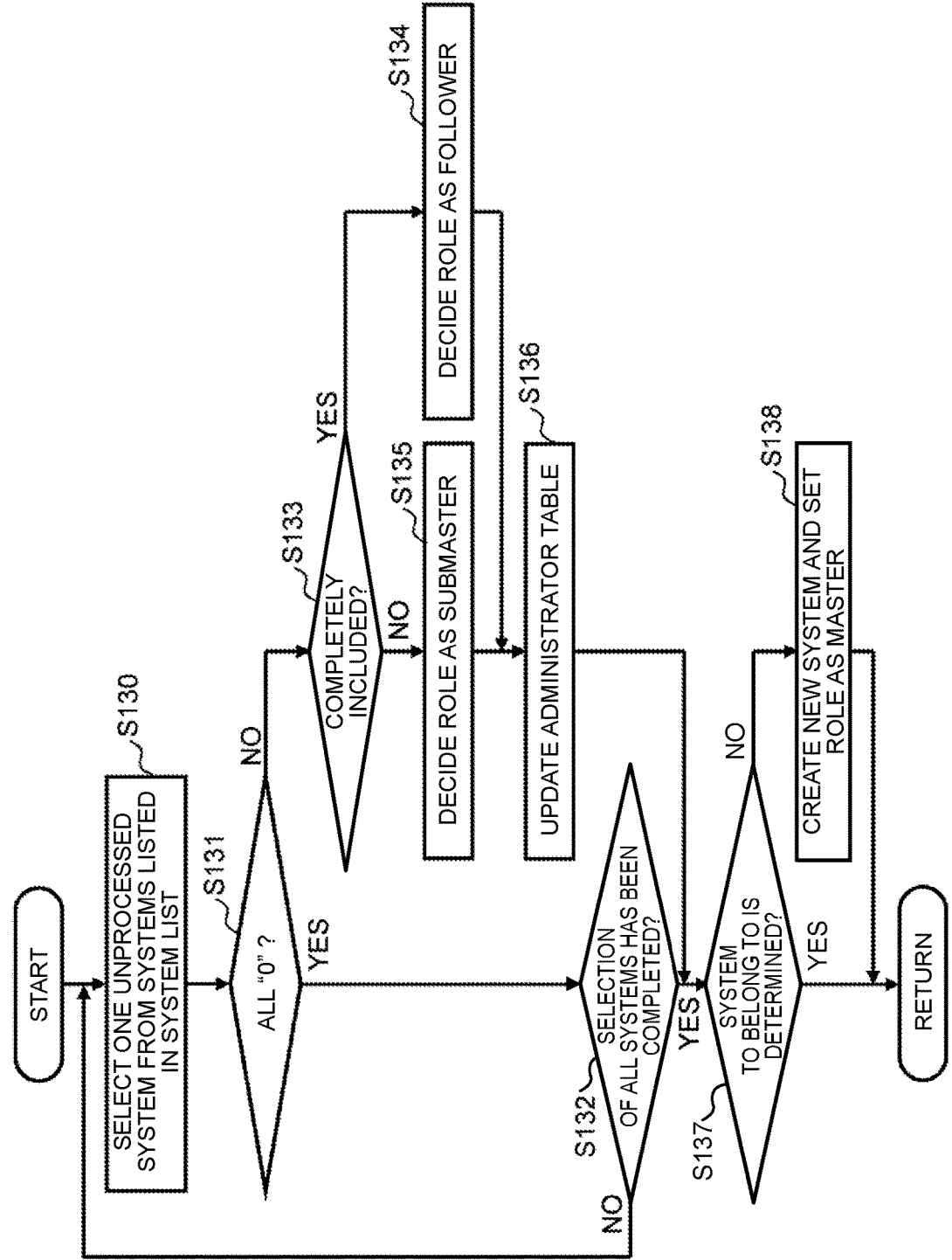
FIG. 17 is a flowchart illustrating a processing sequence for system assignment and role setting processing.

FIG. 17 illustrates specific processing content of the system assignment and role setting processing executed by the administrator role determination/update unit 40 in step S116 of the aforementioned role resetting processing upon suspension of use (FIG. 16).

Having proceeded to step S116 of the role resetting processing upon suspension of use, the administrator role determination/update unit 40 starts the system assignment and role setting processing illustrated in this FIG. 17 and selects one system from systems listed in the system list at that time (S130).

Subsequently, the administrator role determination/update unit 40 executes the bitwise OR operation of the management resource bit sets of all the storage administrators belonging to the system selected in step S130 (hereinafter referred as the selected system). Furthermore, the administrator role determination/update unit 40 executes the bitwise AND operation between the operation result and the selected management resource bit set and judges whether all the respective values of the operation result are "0" or not (S131).

Under this circumstance, to obtain a negative result in this judgment means that the set of management object resources of the storage administrator corresponding to the selected management resource bit set is not duplicate with any set of management object resources of a storage administrator corresponding to any management resource bit sets belonging to the system selected in step S130 (the selected system). Thus, the administrator role determination/update unit 40 then judges whether it has finished selecting all the systems registered in the system list in step S130 (S132).

Then, if the administrator role determination/update unit 40 obtains a negative result in this judgment, it returns to step S130 and then repeats the processing of step S130 to step S132 until it obtains an affirmative result in step S132. Furthermore, when the administrator role determination/update unit 40 eventually obtains the affirmative result in step S132 by finishing executing the processing of step S131 with respect to all the systems listed in the system list, it proceeds to step S137.

On the other hand, to obtain a negative result in the judgment of step S131 means that the set of management object resources of the storage administrator corresponding to the selected management resource bit set is duplicate with a set of management object resources of a storage administrator corresponding to at least one management resource bit set belonging to the system selected in step S130 (the selected system) (that is, the storage administrator corresponding to the selected management resource bit set should belong to the selected system).

Thus, the administrator role determination/update unit 40 then judges whether or not the set of management object resources of the storage administrator corresponding to the selected management resource bit set is included in a union of sets of management object resources of the respective storage administrators who then belong to the selected system (S133).

Specifically speaking, the administrator role determination/update unit 40 executes the bitwise OR operation of the management resource bit sets of the respective storage administrators then belonging to the selected system and executes the bitwise AND operation between the operation result and the selected management resource bit set. Then, the administrator role determination/update unit 40 judges whether this operation result matches the selected management resource bit set or not.

Then, if the administrator role determination/update unit 40 obtains an affirmative result in this judgment, it determines the role of the storage administrator corresponding to the target management resource bit set in the selected system to be a "follower" (S134). Furthermore, if the administrator role determination/update unit 40 obtains a negative result in the judgment of step S133, it determines the role of the storage administrator corresponding to the target management resource bit set in the selected system to be a "submaster" and further assigns a submaster identifier, which is equal to or more than 0 and which is unused and the smallest, to that storage administrator (S135). Incidentally, if the previous role of the storage administrator who is then determined as the "submaster" was a "follower," the administrator role determination/update unit 40 issues an instruction to the management terminal 2 used by that storage administrator to resume the periodic polling processing.

Furthermore, the administrator role determination/update unit 40 updates the information of the target storage administrator which is registered in the administrator table 37 (FIG. 5) in accordance with the determined result in step S134 or step S135 (S136) and then proceeds to step S137.

Having proceeded to step S137, the administrator role determination/update unit 40 judges whether or not a new system to which the resource administrator corresponding to the selected management resource bit set should belong has been determined by the processing from step S130 to step S136 (S137). Then, if the administrator role determination/update unit 40 obtains an affirmative result in this judgment, it terminates this system assignment and role setting processing.

On the other hand, if the administrator role determination/update unit 40 obtains a negative result in the judgment of step S137, it detects the smallest system number, which has not been used yet, by referring to the administrator table 37 and updates the administrator table 37 so as to set the storage administrator corresponding to the selected management resource bit set as the "master" of a new system which is assigned that system number. The administrator role determination/update unit 40 also adds that new system to the system list (S138). Subsequently, the administrator role determination/update unit 40 terminates this system assignment and role setting processing.

(3-1-11) Periodic Polling Resumption Instruction Processing

Figure 18:
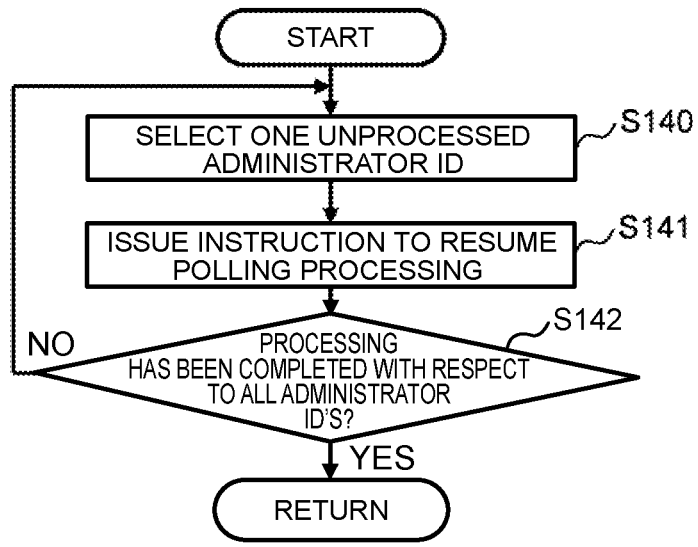
FIG. 18 is a flowchart illustrating a processing sequence for periodic polling resumption instruction processing.

FIG. 18 illustrates specific processing content of the periodic polling resumption instruction processing executed by the administrator role determination/update unit 40 in step S120 of the administrator role resetting processing described earlier with reference to FIG. 16.

Having proceeded to step S120 of the administrator role resetting processing, the administrator role determination/update unit 40 starts the periodic polling resumption instruction processing illustrated in this FIG. 18 and firstly selects one administrator ID from among the administrator ID's listed in the aforementioned role upgrade list (S140).

Subsequently, the administrator role determination/update unit 40 issues an instruction to the management terminal 2 used by the storage administrator to whom the administrator ID selected in step S140 is assigned (hereinafter referred as the selected administrator ID) to resume the periodic polling processing (S141). Specifically speaking, the administrator role determination/update unit 40 acquires the network address, in the first network 5, of the management terminal 2 used by the storage administrator to whom the selected administrator ID is assigned by referring to the administrator table 37 (FIG. 5) and transmits a command to that network address so as to dictate that the periodic polling processing should be resumed.

Next, the administrator role determination/update unit 40 judges whether the execution of the processing of step S141 has been completed or not with respect to all the administrator ID's listed in the role upgrade list (S142). Then, if the administrator role determination/update unit 40 obtains a negative result in this judgment, it returns to step S140 and then repeats the processing of step S140 to step S142 by sequentially switching the administrator ID to be selected in step S140 to another unprocessed administrator ID.

Then, when the administrator role determination/update unit 40 eventually finishes executing the processing of step S141 with respect to all the administrator ID's listed in the role upgrade list, it terminates this periodic polling resumption instruction processing.

(3-1-12) Periodic Polling Monitoring Processing

When the management terminal 2 used by the storage administrator which is set as the "master" or the "submaster" as described earlier becomes unable to execute the periodic polling processing due to, for example, a failure, this will also influence the "followers" of the same system as that of the "master" or the "submaster" so that the performance information of the management object resources will not be push-distributed from the storage apparatus 4 to the "followers" depending on the circumstances.

Figure 19:
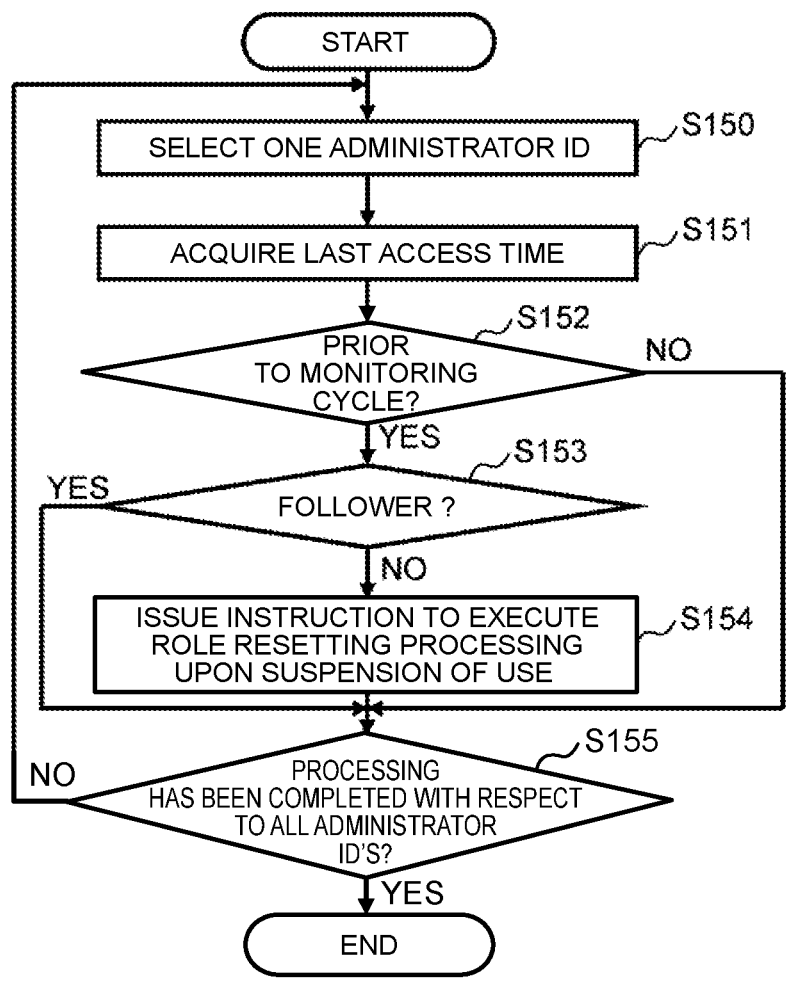
FIG. 19 is a flowchart illustrating a processing sequence for periodic polling monitoring processing.

Therefore, with the storage apparatus 4 according to this embodiment, the periodic polling monitoring unit 42 (FIG. 1) for the storage management program 34 (FIG. 1) periodically executes the periodic polling monitoring processing for monitoring whether the management terminal 2 of the storage administrator who is set as the "master" or the "submaster" is executing the periodic polling processing or not, in accordance with the processing sequence in FIG. 19 on an arbitrary cycle longer the cycle of transmission of the resource performance information transmission request to the storage apparatus by the management terminal 2 (which is an execution cycle of the periodic polling processing, for example, on a 5-second cycle) (for example, on a 15-second cycle and hereinafter referred to as the monitoring cycle).

Then, after starting the periodic polling processing illustrated in this FIG. 19, the periodic polling monitoring unit 42 firstly selects one unprocessed administrator ID, on which the processing of step S151 and subsequent steps has not been executed yet, from the administrator ID's registered in the administrator table 37 (FIG. 5) (S150) and acquires the last access date and time of a storage administrator, to whom the selected administrator ID is assigned, from the administrator table 37 (S151).

Subsequently, the periodic polling monitoring unit 42 judges whether or not the last access date and time acquired in step S151 is time of day before the time of day obtained by subtracting the time of the above-mentioned monitoring cycle from the current time of day (S152). Then, if the periodic polling monitoring unit 42 obtains a negative result in this judgment, it proceeds to step S155.

On the other hand, if the periodic polling monitoring unit 42 obtains an affirmative result in the judgment of step S152, it judges whether the role of the storage administrator with the administrator ID selected in step S150 is a "follower" or not by referring to the administrator table 37 (S153). Then, if the periodic polling monitoring unit 42 obtains an affirmative result in this judgment, it proceeds to step S155.

On the other hand, if the periodic polling monitoring unit 42 obtains a negative result in the judgment of step S153, it issues an instruction to the administrator role determination/ update unit 40 (FIG. 1) to execute the role resetting processing upon suspension of use as described earlier with reference to FIG. 15 (S154). As a result of this, the above-described role resetting processing upon suspension of use is executed by the administrator role determination/update unit 40 and the roles of other storage administrators belonging to the same system as that of the storage administrator to whom the administrator ID selected in step S150 is assigned are reset.

Next, the periodic polling monitoring unit 42 judges whether the execution of the processing of step S151 and subsequent steps has been completed or not with respect to all the administrator ID's registered in the administrator table 37 (S155). Then, if the periodic polling monitoring unit 42 obtains a negative result in this judgment, it returns to step S150 and then repeats the processing from step S150 to step S155 by sequentially switching the administrator ID to be selected in step S150 to another unprocessed administrator ID.

Then, when the periodic polling monitoring unit 42 eventually obtains an affirmative result in step S155 by finishing executing the processing of step S151 and subsequent steps with respect to all the administrator ID's registered in the administrator table 37, it terminates this periodic polling monitoring processing.

Figure 20:
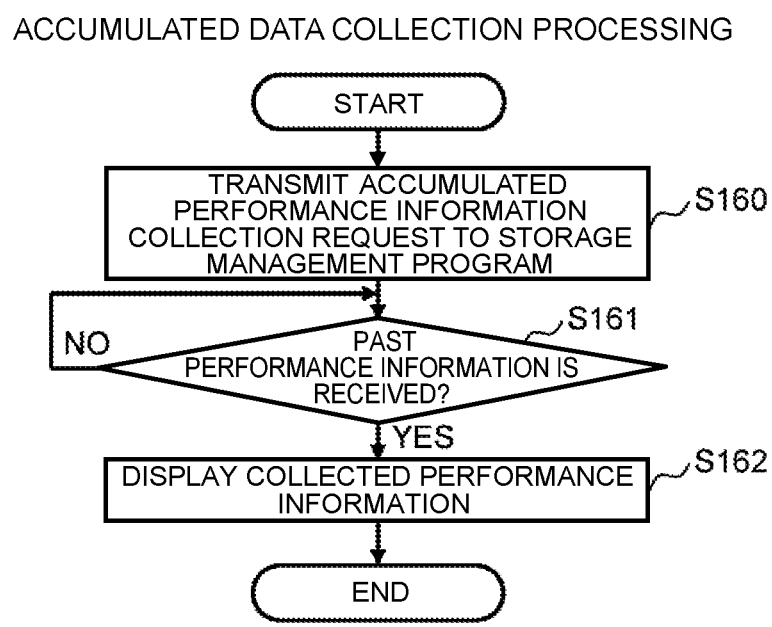
FIG. 20 is a flowchart illustrating a processing sequence for accumulated data transmission request processing.

(3-2) Various Kinds of Processing Regarding Accumulated Data Sharing Function (3-2-1) Accumulated Data Transmission Request Processing FIG. 20 illustrates processing content of accumulated data transmission request processing executed by the accumulated data collection unit 18 (FIG. 1) of the management terminal 2 when the management terminal 2 receives the performance information of the management object resources of the storage administrator, who uses their own terminal, first time after being activated. The accumulated data collection unit 18 requests that the storage apparatus 4 should collect and transmit the past performance information of these management object resources accumulated in other management terminals 2 (hereinafter referred as the accumulated data) in accordance with the processing sequence illustrated in this FIG. 20.

Practically, when the accumulated data collection unit 18 receives the performance information of the management object resources of the relevant storage administrator first time after the activation, it starts the accumulated data transmission request processing illustrated in this FIG. 20 and firstly transmits a request to the storage apparatus 4 that the storage apparatus 4 should collect and transfer the accumulated data which are accumulated in the other management terminals 2 (hereinafter referred as the accumulated data transmission request) (S160). Incidentally, this accumulated data transmission request includes the administrator ID of the storage administrator who uses their own terminal.

Then, the accumulated data collection unit 18 waits for the above-described accumulated data to be transmitted from the storage apparatus 4 (S161); and when the above-described accumulated data is eventually transmitted from the storage apparatus 4, the accumulated data collection unit 18 displays a performance information report which uses the accumulated data on the display device 11 (FIG. 1) (S162). Subsequently, the accumulated data collection unit 18 terminates this accumulated data transmission request processing.

(3-2-2) Accumulated Data Collection Transfer Processing

Figure 21:
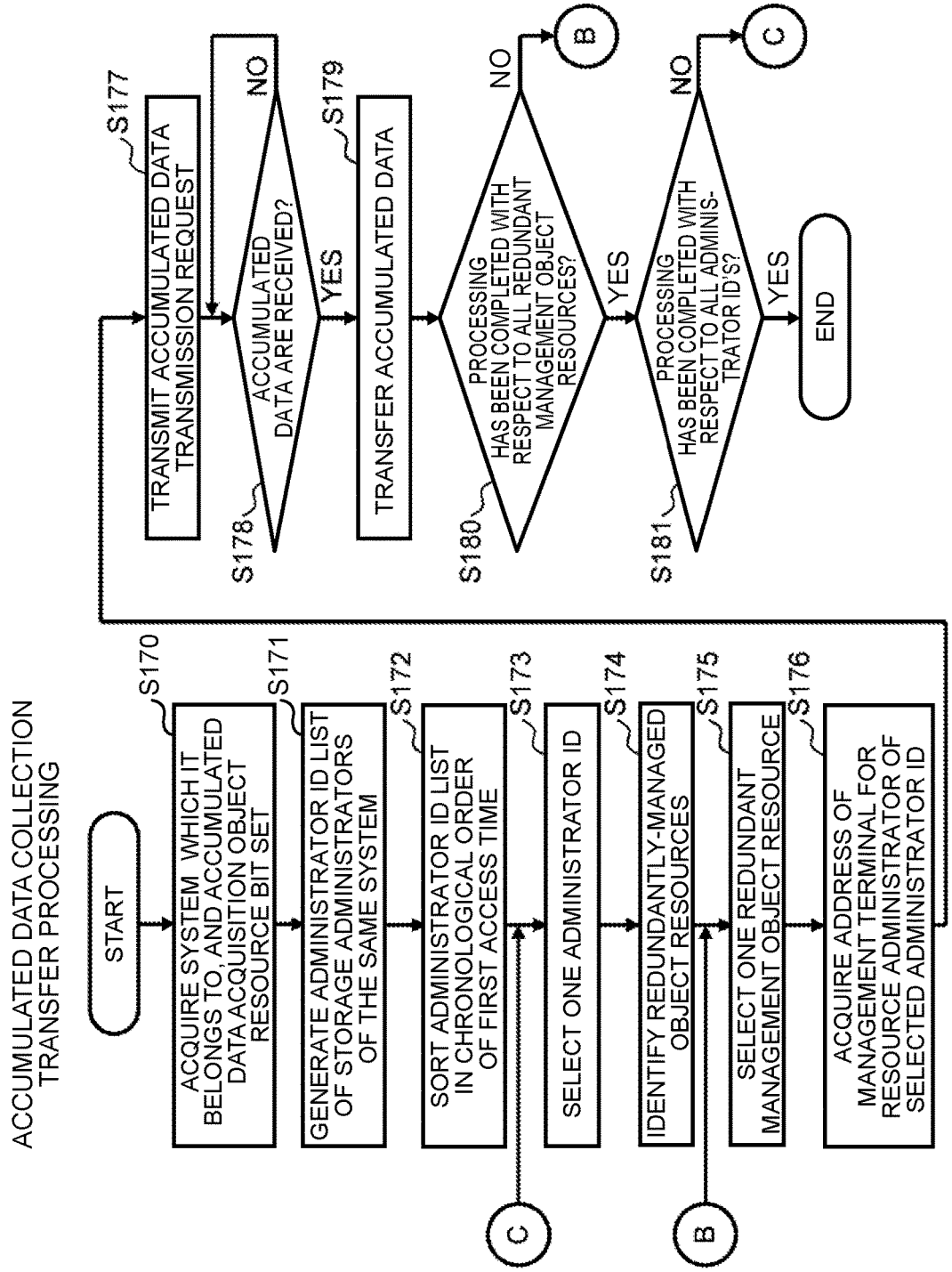
FIG. 21 is a flowchart illustrating a processing sequence for accumulated data collection transfer processing.

FIG. 21 illustrates a flow of a sequence of processing executed by the data distribution control unit 41 (FIG. 1) of the storage management program 34 (FIG. 1) for the storage apparatus 4 which has received the accumulated data transmission request from the accumulated data collection unit 18 of the management terminal 2 in step S160 of FIG. 20 (hereinafter referred as the accumulated data collection transfer processing).

After receiving the above-described accumulated data transmission request, the data distribution control unit 41 starts the accumulated data transmission processing illustrated in this FIG. 21 and firstly acquires a system to which the storage administrator to whom the administrator ID included in the accumulated data transmission request is assigned, and a management resource bit set of that storage administrator from the administrator table 37 (FIG. 5) (S170). Incidentally, in the following explanation, this management resource bit set will be referred to as the accumulated data acquisition object resource bit set.

Subsequently, the data distribution control unit 41 acquires administrator ID's of all other storage administrators belonging to the same system as the system acquired in step S170 from the administrator table 37 and generates an administrator ID list in which these acquired administrator ID's are listed (S171).

Next, the data distribution control unit 41 sorts: the respective administrator ID's listed in the administrator ID list generated in step S171 in chronological order of the first access dates and times registered in the administrator access management table 38 (FIG. 6) (S172); and then selects an unprocessed administrator ID on which the processing of step S174 and subsequent steps has not been executed yet and which is the smallest in the sorting order, from among the administrator ID's listed in the administrator ID list (S173).

Furthermore, the data distribution control unit 41: identifies a storage resource(s) which is redundantly managed by the storage administrator who uses the management terminal 2 which is the sender of the above-described accumulated data collection request (hereinafter referred as the second request sender management terminal 2) (hereinafter referred as the second request sender storage administrator), and the storage administrator to whom the administrator ID selected in step S173 (hereinafter referred as the selected administrator ID) is assigned (hereinafter referred as the redundantly-managed object resource(s)); and acquires its resource ID (S174).

Specifically speaking, the data distribution control unit 41 acquires the management resource bit set of the storage administrator, to whom the administrator ID selected in step S173 is assigned, from the administrator table 37 and executes the bitwise AND operation between the acquired management resource bit set and the accumulated data acquisition object resource bit set acquired in step S170. The storage resources corresponding to the respective bits whose values in the bit set of this operation result become "1" are the redundantly-managed object resources described above. Then, the data distribution control unit 41 acquires the resource ID of each redundantly-managed object resource, which has been thus identified, from the performance information management table 36 (FIG. 4).

Subsequently, the data distribution control unit 41 selects one resource ID from among the resource ID's acquired in step S174 (S175). Furthermore, the data distribution control unit 41 acquires the network address, in the first network 5, of the management terminal used by the storage administrator to whom the selected administrator ID is assigned from the administrator access management table 38 (FIG. 6) (S176). Subsequently, the data distribution control unit 41 transmits an accumulated data transmission request to the network address acquired in step S176 as a destination to request that the past performance information of the storage resource to which the resource ID selected in step S175 is assigned should be transmitted (S177).

Then, the data distribution control unit 41 waits for the past performance information of the storage resource, to which the resource ID selected in step S175 is assigned, to be transmitted as the accumulated data from the corresponding management terminal 2 in response to the above-described accumulated data transmission request (S178). Then, when the data distribution control unit 41 eventually receives the transmission of the above-described accumulated data, it transfers this accumulated data to the second request sender management terminal 2 (S179).

Subsequently, the data distribution control unit 41 acquires the accumulated data with respect to all the redundantly-managed object resources with the resource ID's acquired in step S174 and judges whether the transmission of the acquired accumulated data to the second request sender management terminal 2 has been finished or not (S180). Then, if the data distribution control unit 41 obtains a negative result in this judgment, it returns to step S175 and then repeats the processing from step S175 to step S180 by sequentially switching the resource ID to be selected in step S175 to another unprocessed resource ID.

Furthermore, when the data distribution control unit 41 eventually obtains an affirmative result in step S180 by finishing transmitting the accumulated data to the second request sender management terminal 2 with respect to all the redundantly-managed object resources with the resource ID's acquired in step S174, it judges whether the execution of the processing from step S174 to step S180 has been completed or not with respect to all the storage administrators with the administrator ID's listed in the administrator ID list generated in step S171 (S181).

If the data distribution control unit 41 obtains a negative result in this judgment, it returns to step S173 and then repeats the processing from step S173 to step S181 by sequentially switching the administrator ID to be selected in step S173 to another unprocessed administrator ID.

Then, when the data distribution control unit 41 obtains an affirmative result in step S181 by finishing executing the processing of step S174 to step S180 with respect to all the storage administrators with the administrator ID's listed in the administrator ID list, it terminates this accumulated data collection transfer processing.

(3-2-3) Accumulated Data Transmission Processing

Figure 22:
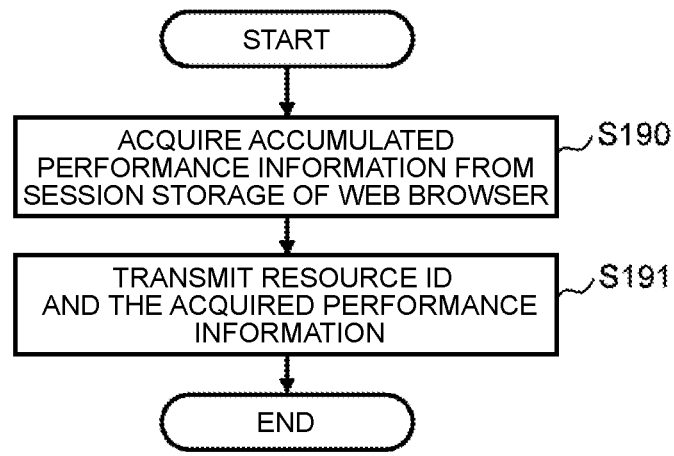
FIG. 22 is a flowchart illustrating a processing sequence for accumulated data transmission processing.

FIG. 22 illustrates a flow of the accumulated data transmission processing executed by the accumulated data transmission unit 17 (FIG. 1) of the management terminal 2 which has received the accumulated data transmission request transmitted from the data distribution control unit 41 of the storage apparatus 4 in step S177 of the accumulated data collection transfer processing described above with reference to FIG. 21. The accumulated data transmission unit 17 transmits the requested accumulated data to the storage apparatus 4 in accordance with the processing sequence illustrated in this FIG. 22.

Practically, after receiving the above-described accumulated data transmission request, the accumulated data transmission unit 17 starts the accumulated data transmission processing illustrated in this FIG. 22 and firstly acquires all pieces of performance information of the storage resource to which the resource ID designated in the accumulated data transmission request is assigned, by using the designated resource ID as a key from the session storage of the web browser 15 (FIG. 1) (S190).

Subsequently, the accumulated data transmission unit 17 transmits the performance information acquired in step S190 together with the resource ID designated in the accumulated data transmission request to the storage apparatus 4 (S191). Subsequently, the accumulated data transmission unit 17 terminates this accumulated data transmission processing.

(4) Advantageous Effects of This Embodiment

The information processing system 1 according to this embodiment as described above causes the management terminal 2 of the storage administrator who is set as the "follower" to stop the periodic polling; and at the stage where the performance information of each management object resource of that storage administrator is completed in the performance information management table 36, the information processing system 1 reads these pieces of performance information from the performance information management table 36 and performs push distribution of such performance information. Therefore, when this information processing system 1 is employed, the processing of the storage apparatus 4 with respect to the periodic polling of the management terminal 2 of the storage administrator(s) who is/are set as the "follower(s)" can be omitted and, therefore, it is possible to reduce the load and necessary memory capacity on the side of the storage apparatus 4 which are required to manage the storage apparatus 4.

Furthermore, with this information processing system 1, regarding the resource performance information transmission request from the management terminal 2 used by the storage administrator who is set as the "master," the storage apparatus 4 collects the latest performance information of all the management object resources of that storage administrator and transmit the collected latest performance information to the relevant management terminal 2; and regarding the resource performance information transmission request from the management terminal 2 used by the storage administrator who is set as the "submaster," the storage apparatus 4 collects only the latest performance information of the management object resources of that storage administrator, which are not duplicate with the management object resources of the storage administrator who is set as the "master," reads the performance information of the remaining management object resources from the performance information management table 36, and merges these pieces of the performance information and transmits the merged performance information to the relevant management terminal 2.

Therefore, regarding this information processing system 1, when the resource performance information transmission request from the management terminal 2 used by the storage administrator who is set as the "submaster" is given to the storage apparatus 4, the storage apparatus 4 can omit the processing for collecting the performance information of the storage resources, which are duplicate with the management object resources of the storage administrator who is set as the "master," among the management object resources of the storage administrator who is set as the "submaster"; and, therefore, it is possible to further reduce the load and necessary memory capacity on the side of the storage apparatus 4 which are required to manage the storage apparatus 4.

(5) Other Embodiments

Incidentally, the aforementioned embodiment has described the case where the present invention is applied to the storage apparatus 4 for the information processing system 1 configured as illustrated in FIG. 1; however, the present invention is not limited to this example and, basically, the invention can be applied to a wide variety of storage apparatuses as long as each of such storage apparatuses transmits the performance information of each storage resource which is a management object of a storage administrator who uses the relevant management terminal, in response to a resource performance information transmission request transmitted from each management terminal used by each of a plurality of storage administrators.

Furthermore, the aforementioned embodiment has described the case where the three roles which are the "master," "submaster," and "follower" are set as the roles of the storage administrators; however, the present invention is not limited to this example and only the two types of roles, the "follower" and "master," may be used. In this case, a storage administrator whose set of management object resources is included in a set of management object resources of another one storage administrator or a union of sets of management object resources of a plurality of other storage administrators may be set as the "follower"; and all storage administrators, regarding each of whom their set of management object resources includes a part or whole of the set of management object resources of the storage administrator who is set as the "follower," may be set as "masters."

INDUSTRIAL APPLICABILITY

The present invention can be applied to a wide variety of storage apparatuses which transmit performance information of each storage resource that is a management object of a storage administrator who uses the relevant management terminal in response to a resource performance information transmission request transmitted from each management terminal used by each of a plurality of storage administrators.

REFERENCE SIGNS LIST

1: information processing system
2: management terminal
3: business terminal
4: storage apparatus
11: display device
12, 30: CPU
13, 31: memory
15: web browser
16: data reception and periodic polling necessity judgment unit
17: accumulated data transmission unit
18: accumulated data collection unit
34: storage management program
35: resource control program
36: performance information management table
37: administrator table
38: administrator access management table
40: administrator role determination/update unit
41: data distribution control unit
42: periodic polling monitoring unit
43: resource access control unit
44: performance information collection unit

The invention claimed is:

1. A storage apparatus for transmitting performance information of each of storage resources that are management objects of a storage administrator who uses a management terminal in response to a first request transmitted from each of management terminals used by each of a plurality of storage administrators,
- each of the management terminals executing periodic polling for periodically transmitting the first request to the storage apparatus,
- the storage apparatus comprising:
  - a memory;
  - an input/output device; and
  - a processor communicatively coupled to the memory and the input/output device, the processor is configured to:
  - determine a role of each storage administrator based on an inclusion relation between sets of the storage resources which are management objects between the storage administrators;
  - collect the performance information of the storage resources; and
  - distribute the performance information of each of the storage resources which are the management objects of the storage administrator who uses the management terminal, in response to the first request from that management terminal,
- wherein the processor sets the role of the storage administrator, whose set of the storage resources which are the management objects is included in a set of the storage resources which are the management objects of one of the storage administrators or a union of sets of the storage resources which are the management objects of the plurality of storage administrators, as a first role;
- wherein in response to the first request from the management terminal used by the storage administrator who is assigned the role other than the first role, the processor requests collection of the performance information of the storage resource, acquires the performance information requested, transmits, via the input/output device, the acquired performance information to the relevant management terminal, and stores and retains, via the memory, the acquired performance information;
- wherein regarding the management terminal used by the storage administrator who is determined to be assigned the first role, the processor issues an instruction to the management terminal to stop the periodic polling and performs push distribution of the performance information to the relevant management terminal at a stage where the performance information of all the storage resources which are the management objects of the relevant storage administrator are acquired;
- wherein when the set of the storage resources which are the management objects of the storage administrator with the first role is included in a union of sets of the storage resources which are the management objects of the plurality of storage administrators where the set of the storage resources which are the management objects is not included in a set of the storage resources which are the management objects of another storage administrator, the processor assigns a second role to one of the plurality of storage administrators and assigns a third role to remaining storage administrators of the plurality of storage administrators;
- wherein in response to the first request from the management terminal used by the storage administrator to whom the second role is set, the processor requests collection of the performance information of all the storage resources, which are the management objects of the relevant storage administrator, acquires such performance information, transmits the acquired performance information to the relevant management terminal, and also stores and retains the acquired performance information; and
- wherein in response to the first request from the management terminal used by the storage administrators to whom the third role is set, the processor requests collection of the performance information of the storage resources which are not duplicate with the storage resources that are the management objects of the storage administrator to whom the second role is set, from among the storage resources which are the management objects of the storage administrators to whom the third role is set, acquires the requested performance information, stores and retains the acquired performance information, merges the acquired performance information with the performance information, which is acquired, stored, and retained in response to the first request from the management terminal used by the storage administrator to whom the second role is set, of the storage resources that are duplicate with the storage resources which are the management objects of the storage administrator to whom the second role is set, and transmits the merged performance information to the management terminal used by the storage administrators to whom the third role is set.

2. The storage apparatus according to claim 1,
- wherein when the set of the storage resources which are the management objects of the storage administrator with the first role is included in a union of sets of the storage resources which are the management objects of the plurality of storage administrators where the set of the storage resources which are the management objects is not included in a set of the storage resources which are the management objects of another storage administrator, the second role is set to one of the storage administrators with a largest number of the storage resources which are the management objects, from among the plurality of storage administrators, and the third role is set to remaining storage administrators among the plurality of storage administrators.

3. The storage apparatus according to claim 1,
- wherein the processor determines the role of each of the storage administrators for each aggregate of the storage administrators, regarding whom some or all of the storage resources which are the management objects are duplicate with the storage resources which are the management objects of another storage administrator, within the relevant aggregate.

4. The storage apparatus according to claim 3,
- wherein when the processor is notified by the management terminal used by the storage administrator according to operation by the storage administrator that the periodic polling is terminated, the processor resets the role of each storage administrator, other than the relevant storage administrator belonging to the relevant aggregate, within the aggregate to which the relevant storage administrator belongs; and
- wherein processor issues an instruction to the management terminal used by the storage administrator, for whom the role before the resetting is set to the first role and the role after the resetting is set to the second role or the third role, to resume the periodic polling.

5. The storage apparatus according to claim 3,
- wherein the processor is further configured to monitor the first request given from each of the management terminals, wherein when the first request is not given from any one of the management terminals for a certain period of time, the processor resets the role of each of the storage administrators belonging to the aggregate, to which the storage administrator using the relevant management terminal belongs, within the aggregate; and wherein the processor issues an instruction to the management terminal used by the storage administrator, for whom the role before the resetting is set to the first role and the role after the resetting is set to the second role or the third role, to resume the periodic polling.

6. The storage apparatus according to claim 1, wherein in response to a second request from the management terminal, the processor: collects the performance information in the past of the storage resources from the other management terminals storing and retaining the performance information in the past of the storage resources, which are the management objects of the storage administrator who uses the management terminal which is a sender of the second request; and transmits the collected performance information to the management terminal which is the sender of the second request.

7. A method for controlling a storage apparatus for transmitting performance information of each of storage resources that are management objects of a storage administrator who uses a management terminal in response to a first request transmitted from each of management terminals used by each of a plurality of storage administrators, each of the management terminals executing periodic polling for periodically transmitting the first request to the storage apparatus, the storage apparatus including:
a memory;
an input/output device; and
a processor communicatively coupled to the memory and the input/output device, the processor is configured to:
determines a role of each storage administrator based on an inclusion relation between sets of the storage resources which are management objects between the storage administrators;
collect the performance information of the storage resources; and
distribute the performance information of each of the storage resources which are the management objects of the storage administrator who uses the management terminal, in response to the first request from that management terminal, and the storage apparatus control method comprising:
a first step executed by the processor setting the role of the storage administrator, whose set of the storage resources which are the management objects is included in a set of the storage resources which are the management objects of one of the storage administrators or a union of sets of the storage resources which are the management objects of the plurality of storage administrators, as a first role;

a second step executed: in response to the first request from the management terminal used by the storage administrator who is assigned the role other than the first role, by the processor requesting collection of the performance information of the storage resource, acquiring performance information requested, transmitting, via the input/output device, the acquired performance information to the relevant management terminal, and storing and retaining, via the memory, the acquired performance information; and regarding the management terminal used by the storage administrator who is determined to be assigned the first role, by processor, issuing an instruction to the management terminal to stop the periodic polling and performing push distribution of the performance information to the relevant management terminal at a stage where the performance information of all the storage resources which are the management objects of the relevant storage administrator are acquired;

wherein in the first step, when the set of the storage resources which are the management objects of the storage administrator with the first role is included in a union of sets of the storage resources which are the management objects of the plurality of storage administrators where the set of the storage resources which are the management objects is not included in a set of the storage resources which are the management objects of another storage administrator, the role determination unit assigns a second role to one of the plurality of storage administrators and assigns a third role to remaining storage administrators of the plurality of storage administrators; and wherein in the second step, in response to the first request from the management terminal used by the storage administrator to whom the second role is set, the processor requests collection of the performance information of all the storage resources, which are the management objects of the relevant storage administrator, acquires such performance information, transmits the acquired performance information to the relevant management terminal, and also stores and retains the acquired performance information; and in response to in response to the first request from the management terminal used by the storage administrators to whom the third role is set, the processor requests collection of the performance information of the storage resources which are not duplicate with the storage resources that are the management objects of the storage administrator to whom the second role is set, from among the storage resources which are the management objects of the storage administrators to whom the third role is set, acquires the requested performance information, stores and retains the acquired performance information, merges the acquired performance information with the performance information, which is acquired, stored, and retained in response to the first request from the management terminal used by the storage administrator to whom the second role is set, of the storage resources that are duplicate with the storage resources which are the management objects of the storage administrator to whom the second role is set, and transmits the merged performance information to the management terminal used by the storage administrators to whom the third role is set.

8. The storage apparatus control method according to claim 7, wherein in the second step, when the set of the storage resources which are the management objects of the storage administrator with the first role is included in a union of sets of the storage resources which are the management objects of the plurality of storage administrators where the set of the storage resources which are the management objects is not included in a set of the storage resources which are the management objects of another storage administrator, the second role is set to one of the storage administrators with a largest number of the storage resources which are the management objects, from among the plurality of storage administrators, and the third role is set to remaining storage administrators among the plurality of storage administrators.

9. The storage apparatus control method according to claim 7,
wherein processor determines the role of each of the storage administrators for each aggregate of the storage administrators, regarding whom some or all of the storage resources which are the management objects are duplicate with the storage resources which are the management objects of another storage administrator, within the relevant aggregate.

10. The storage apparatus control method according to claim 9,
wherein when the processor is notified by the management terminal used by the storage administrator according to operation by the storage administrator that the periodic polling is terminated, the processor resets the role of each storage administrator, other than the relevant storage administrator belonging to the relevant aggregate, within the aggregate to which the relevant storage administrator belongs; and
wherein the processor issues an instruction to the management terminal used by the storage administrator, for whom the role before the resetting is set to the first role and the role after the resetting is set to the second role or the third role, to resume the periodic polling.

11. The storage apparatus control method according to claim 9,
wherein the processor is further configured to monitor the first request given from each of the management terminals,
wherein when the first request is not given from any one of the management terminals for a certain period of time, the processor resets the role of each of the storage administrators belonging to the aggregate, to which the storage administrator using the relevant management terminal belongs, within the aggregate; and
wherein the processor issues an instruction to the management terminal used by the storage administrator, for whom the role before the resetting is set to the first role and the role after the resetting is set to the second role or the third role, to resume the periodic polling.

12. The storage apparatus control method according to claim 7,
wherein in the second step, in response to a second request from the management terminal, the processor: collects the performance information in the past of the storage resources from the other management terminals storing and retaining the performance information in the past of the storage resources, which are the management objects of the storage administrator who uses the management terminal which is a sender of the second request; and transmits the collected performance information to the management terminal which is the sender of the second request.

* * * * *